US010929122B1

(12) United States Patent
Goodwin et al.

(10) Patent No.: US 10,929,122 B1
(45) Date of Patent: Feb. 23, 2021

(54) MODIFYING PROGRAM MODULES IN RUNNING APPLICATIONS

(71) Applicant: Microsoft Technology Licensing, LLC, Redmond, WA (US)

(72) Inventors: Robert Lovejoy Goodwin, Mercer Island, WA (US); Dragos Barac, Sammamish, WA (US); Abhinav Jain, Redmond, WA (US); Krystian Krzysztof Walec, Sammamish, WA (US); Pedram Faghihi Rezaei, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/662,001

(22) Filed: Oct. 23, 2019

(51) Int. Cl.
*G06F 8/656* (2018.01)
*G06F 9/445* (2018.01)
*G06F 16/248* (2019.01)
*G06F 16/2455* (2019.01)

(52) U.S. Cl.
CPC .......... *G06F 8/656* (2018.02); *G06F 9/44557* (2013.01); *G06F 16/248* (2019.01); *G06F 16/2455* (2019.01)

(58) Field of Classification Search
CPC .... G06F 8/656; G06F 9/44557; G06F 16/248; G06F 16/2455
See application file for complete search history.

(56) References Cited

U.S. PATENT DOCUMENTS

| 6,314,567 | B1 * | 11/2001 | Oberhauser | G06F 8/656 717/170 |
|---|---|---|---|---|
| 7,100,172 | B2 | 8/2006 | Voelm et al. | |
| 8,352,933 | B2 * | 1/2013 | Amann | G06F 8/656 717/170 |
| 10,230,597 | B2 * | 3/2019 | Parandehgheibi | H04L 41/0893 |

(Continued)

FOREIGN PATENT DOCUMENTS

CN   107729041 A  *  2/2018  ............. G06F 8/656

OTHER PUBLICATIONS

Yamato et al., "A Runtime Code Modification Method for Application Programs", Jul. 2008, Linux corporation (Year: 2008).*

(Continued)

*Primary Examiner* — Wei Y Zhen
*Assistant Examiner* — Junchun Wu

(57) ABSTRACT

A technique is described herein for updating a running application that includes a plurality of program modules (e.g., services). The technique performs its updating operation without having to suspend the execution of the running application, and without reloading all of the program modules in the running application. The technique leverages a mapping component to map a calling program module's call to a function to a called program module that implements the function. A current application manifest provides mapping logic for use by the mapping component. In some examples, the technique also transforms data passed by the calling program module to conform to a data format expected by the called program module. This is appropriate when the calling program module and the called program module use different schemas to define the data.

20 Claims, 16 Drawing Sheets

(56) References Cited

U.S. PATENT DOCUMENTS

| | | | | |
|---|---|---|---|---|
| 10,579,367 | B2* | 3/2020 | Lander | G06F 8/656 |
| 10,761,835 | B1* | 9/2020 | Koppel | G06F 8/34 |
| 2004/0107416 | A1* | 6/2004 | Buban | G06F 8/656 |
| | | | | 717/170 |
| 2012/0185767 | A1* | 7/2012 | Schlegel | G06F 40/197 |
| | | | | 715/255 |
| 2013/0332917 | A1* | 12/2013 | Gaither | G06F 8/656 |
| | | | | 717/170 |
| 2014/0101645 | A1* | 4/2014 | Buzaski | G06F 16/178 |
| | | | | 717/168 |
| 2014/0298452 | A1* | 10/2014 | Heng | G06F 21/572 |
| | | | | 726/22 |
| 2014/0351233 | A1* | 11/2014 | Crupi | G06F 16/24568 |
| | | | | 707/706 |
| 2017/0004185 | A1* | 1/2017 | Zhu | G06F 3/04842 |
| 2017/0011035 | A1* | 1/2017 | Melnik | G06F 16/86 |
| 2019/0243638 | A1* | 8/2019 | Fuglsang | G06F 8/656 |
| 2019/0370484 | A1* | 12/2019 | Klein | G06F 21/6218 |

OTHER PUBLICATIONS

An et al., "An Event-based Formal Framework for Dynamic Software Update", 2015, IEEE (Year: 2015).*

Meurice et al., "Detecting and Preventing Program Inconsistencies Under Database Schema Evolution", 2016, IEEE (Year: 2016).*

Zhang et al., "Implementation and Research of Bootloader for Automobile ECU Remote Incremental Update", 2015, Atlantis Press (Year: 2015).*

Bellahsene et al., "On Evaluating Schema Matching and Mapping", 2011, Springer-Verlag Berlin Heidelberg (Year: 2011).*

U.S. Appl. No. 16/540,896, Goodwin, et al., filed Aug. 14, 2019, "Orchestration and Scheduling of Services," 58 pages.

"Isolated Applications and Side-by-side Assemblies," available at https://docs.microsoft.com/enus/windows/win32/sbscs/isolated-applications-and-side-by-side-assemblies-portal, Microsoft Corporation, Redmond, WA, May 30, 2018, 2 pages.

"Authoring DLLs for Side-by-side Assemblies," available at https://docs.microsoft.com/enus/windows/win32/sbscs/authoring-a-dll-for-a-side-by-side-assembly, Microsoft Corporation, Redmond, WA, May 30, 2018, 3 pages.

"Guidelines for Creating Side-by-side Assemblies," available at https://docs.microsoft.com/enus/windows/win32/sbscs/guidelines-for-creating-side-by-side-assemblies, Microsoft Corporation, Redmond, WA, May 30, 2018, 2 pages.

"Dynamic-Link Library Updates," available at https://docs.microsoft.com/enus/windows/win32/dlls/dynamic-link-library-updates, Microsoft Corporation, Redmond, WA, May 30, 2018, 1 page.

"Dynamic-Link Library Redirection," available at https://docs.microsoft.com/enus/windows/win32/dlls/dynamic-link-library-redirection, Microsoft Corporation, Redmond, WA, May 30, 2018, 2 pages.

"Assembly manifest," available at https://docs.microsoft.com/enus/dotnet/standard/assembly/manifest, Microsoft Corporation, Redmond, WA, Aug. 19, 2019, 3 pages.

* cited by examiner

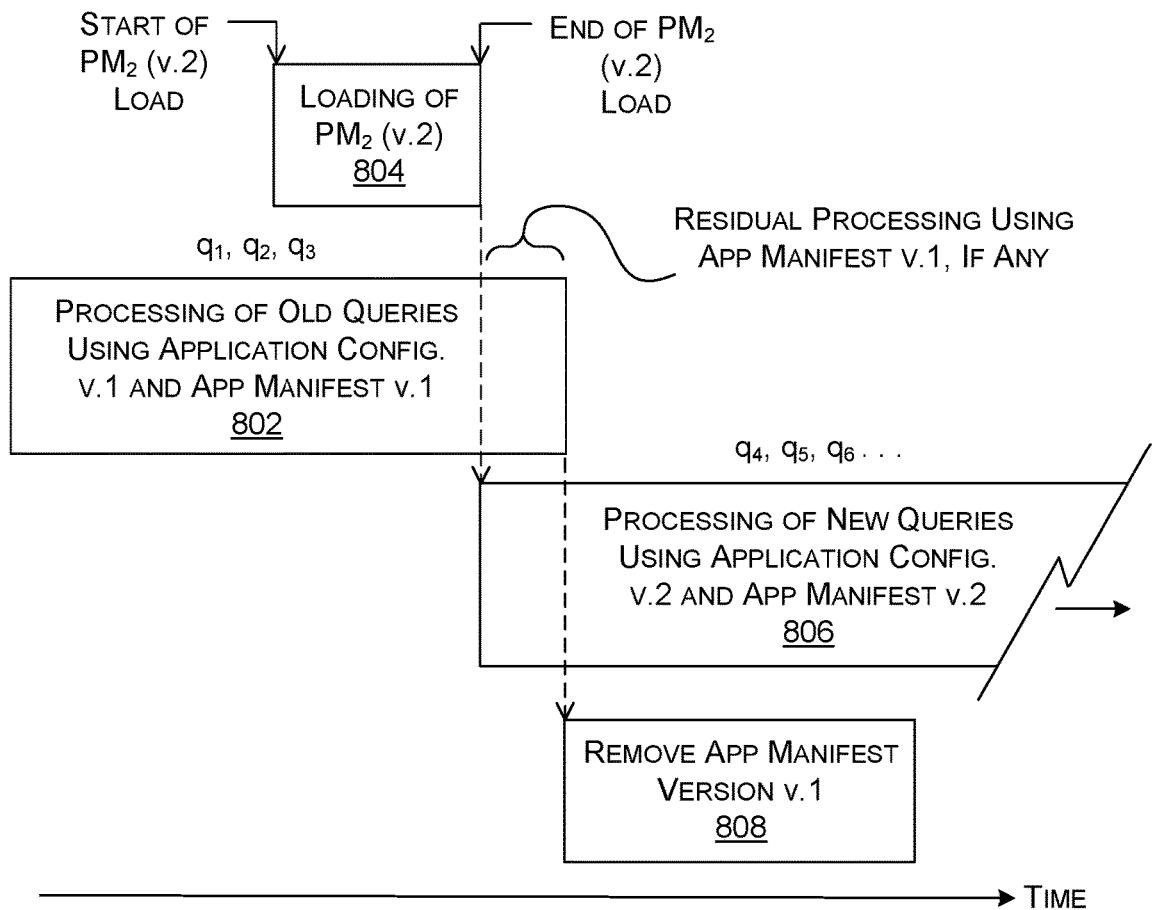
FIG. 8
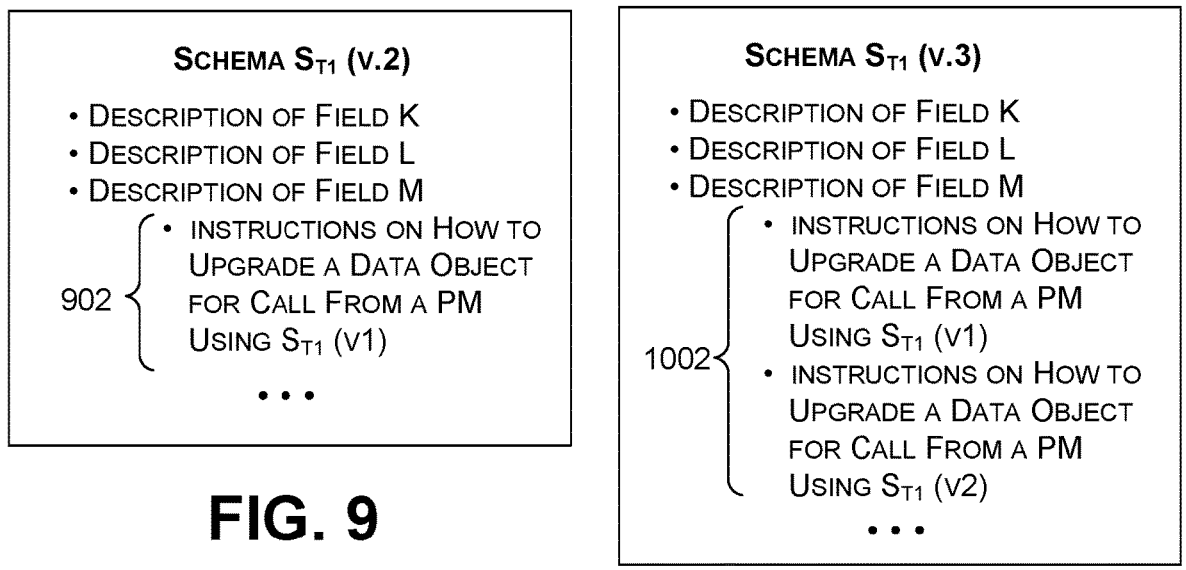
FIG. 9
FIG. 10

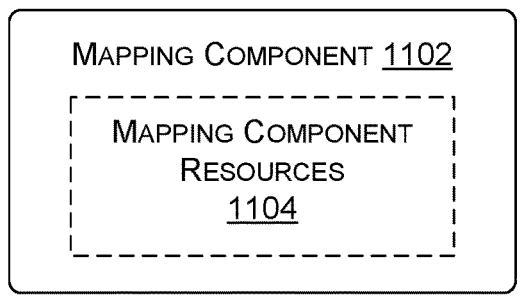
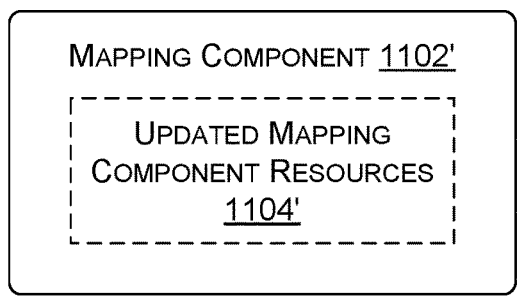
FIG. 11
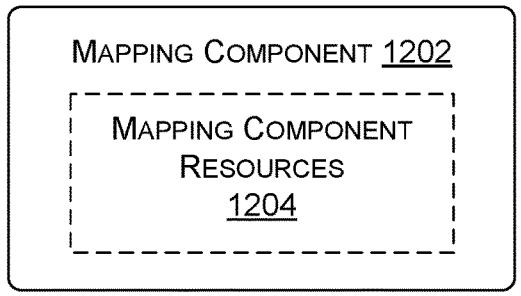
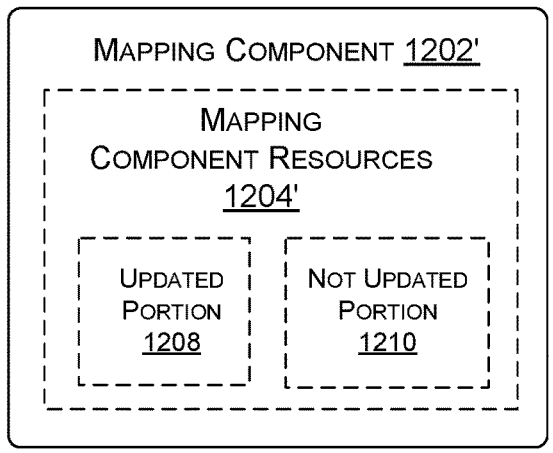
FIG. 12
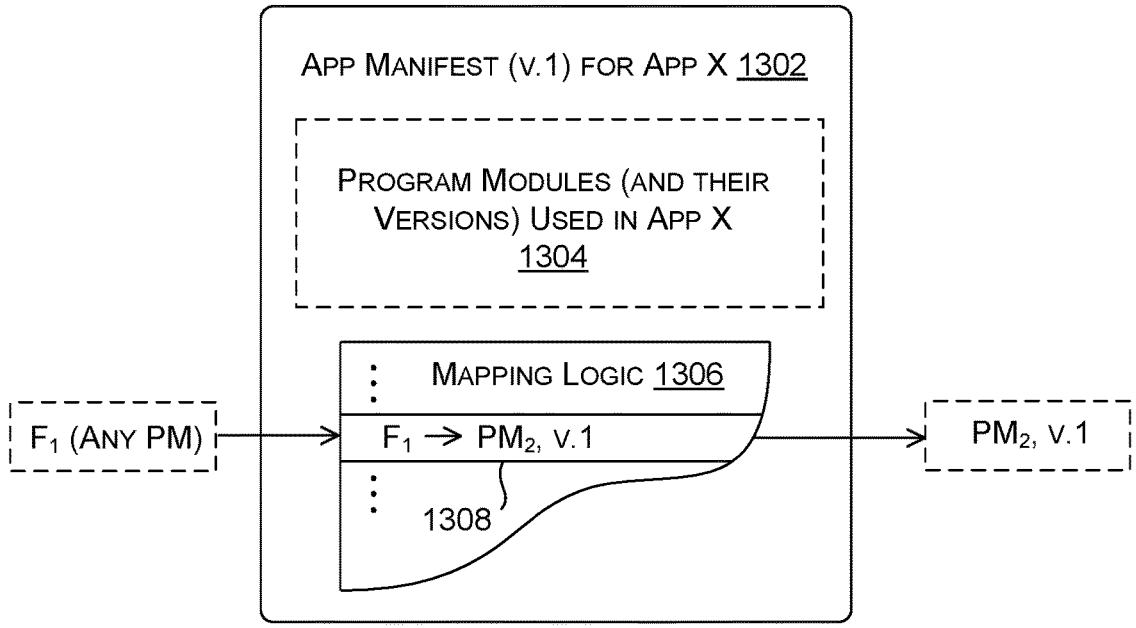
FIG. 13

OVERVIEW OF OPERATION OF THE RUNTIME ENVIRONMENT
1902

PROVIDE A FIRST CONFIGURATION OF THE RUNNING APPLICATION IN A RUNTIME ENVIRONMENT, THE FIRST CONFIGURATION OF THE RUNNING APPLICATION INCLUDING A FIRST SET OF PROGRAM MODULES PROVIDED IN MEMORY, THE FIRST SET OF PROGRAM MODULES BEING DESCRIBED BY A FIRST VERSION OF AN APPLICATION MANIFEST.
1904

RECEIVE NEW PROGRAM CODE THAT SPECIFIES A MODIFICATION TO THE FIRST CONFIGURATION OF THE RUNNING APPLICATION.
1906

UPDATE THE FIRST VERSION OF THE APPLICATION MANIFEST TO CREATE A SECOND VERSION OF THE APPLICATION MANIFEST.
1908

UPDATE THE FIRST CONFIGURATION OF THE RUNNING APPLICATION TO PROVIDE A SECOND CONFIGURATION OF THE RUNNING APPLICATION, WHILE THE FIRST CONFIGURATION OF THE RUNNING APPLICATION CONTINUES TO RUN, THE SECOND CONFIGURATION OF THE RUNNING APPLICATION INCLUDING A SECOND SET OF PROGRAM MODULES THAT IS DESCRIBED BY THE SECOND VERSION OF THE APPLICATION MANIFEST, A SUBSET OF ONE OR MORE PROGRAM MODULES IN THE SECOND SET OF PROGRAM MODULES ALSO BELONGING TO THE FIRST SET OF PROGRAM MODULES..
1910

MODIFYING PROGRAM MODULES IN RUNNING APPLICATIONS

BACKGROUND

A cloud computing environment may provide an instantiated application at runtime that includes a plurality of program modules, e.g., where the program modules correspond to runtime instantiations of dynamic linked libraries (DLLs). The plurality of program modules may perform different respective functions within the instantiated application. Runtime management functionality dynamically links the program modules together upon the loading of these program modules into memory.

The implementation of an instantiated application using program modules facilitates the task of updating the application. That is, a developer typically designs a DLL as a largely self-contained body of code. This enables the developer to later modify the DLL in a manner that is largely independent of other program modules that compose the instantiated application. Nevertheless, in practice, updating an application composed of plural program modules poses technical challenges.

SUMMARY

A technique is described herein for updating a running application, where that application includes a plurality of program modules (e.g., services). The technique performs its updating operation without having to suspend the execution of the running application, and without necessarily reloading all of the program modules in the running application. According to one illustrative aspect, the technique provides a mechanism that allows two program modules in the running application to interact, even though they define data in an inconsistent manner, e.g., using different respective versions of a schema. For example, the mechanism allows a calling program module to successfully invoke a function implemented by a called program module, even though the calling program module and the called program module use different versions of a schema to define the type of a data item consumed by the function.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 is a timeline that shows an illustrative sequencing of operations that occur in the runtime environment of FIG. 6.

FIGS. 9 and 10 show respective examples of schemas that describe data types.

FIG. 11 shows one way of updating a mapping component (which is an element of the runtime environment).

FIG. 12 shows another way of updating a mapping component, differing from the first way (of FIG. 11) by allowing piecemeal updating of resources associated with the mapping component.

FIGS. 13-16 show the illustrative operation of the mapping component, according to different respective implementations of that element.

FIGS. 19 and 20 together show an illustrative process for updating a running application using the runtime environment of FIG. 6.

Figure 1:
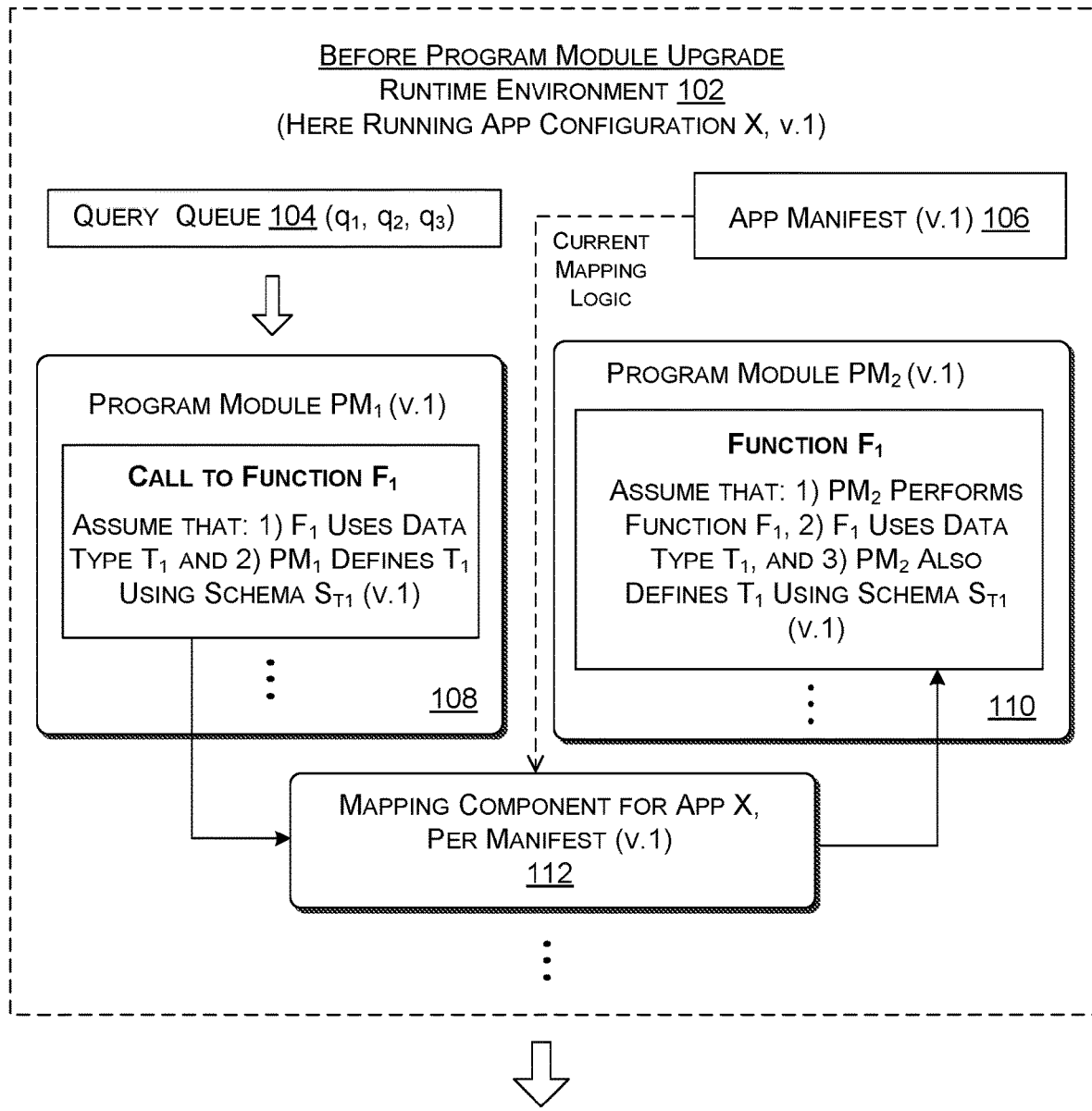
FIGS. 1 and 2 together show a first example of a technique for updating a running application.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a system for updating a running application, where that running application is made up of plural program modules. Section B sets forth an illustrative method that explains the operation of the system of Section A. And Section C describes illustrative computing functionality that can be used to implement any aspect of the features described in Sections A and B.

As a preliminary matter, in certain contexts, a "component," "module," "engine," or "tool" refers to a unit of hardware-implemented logic configured to perform specified operation(s) using any hardware resource(s). The hardware resources may include, but are not limited to, one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. More generally, the term "hardware logic circuitry" refers to hardware-implemented logic that encompasses one or more functional units (e.g., one or more components). Section C provides additional information regarding one implementation of the hardware logic circuitry.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and non-transitory computer-readable medium are meant to expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing System

As used herein, a "running application" refers to at least one execution-time instance of an application's software code. The running application may include plural program modules that perform respective functions. Each program module corresponds to an execution-time instance of program code, e.g., as expressed as a dynamic linked library (DLL) or some other kind of software component. A "runtime environment" refers to a system that hosts and manages a running application. For instance, the runtime environment includes a runtime management system that dynamically links together a plurality of program modules at the time of their loading.

A cloud computing environment may concurrently host plural instantiations of an application's software code. The cloud computing environment can run these instantiations in parallel. To simplify explanation, the principles set forth below will be mostly set forth in the context of a single instantiation of the application's software code. More broadly, however, the term "running application" is meant to encompass either a single instantiation of the application's software code or plural instantiations of application's software code spread across a data center.

A "process" refers to a part of an instance of a running application (and associated data) that is hosted by a particular hardware resource, such as a particular server, or a particular cluster of servers, etc. In some cases, a single hardware resource may host a complete instance of a running application. In other cases, an instance of a running application can be executed by two or more hardware resources. In a cloud computing environment, the runtime management system can be viewed as a distributed resource that manages plural processes implemented by plural physical resources (e.g., servers).

An application manifest refers to information that identifies a collection of program modules that are included in a configuration of a running application. The application manifest also describes the connections between the program modules.

The term "configuration of a running application" as used herein refers to a collection of program modules that make up a running application, as defined by a particular version of an application manifest associated with that running application. A first and second configurations of a running application therefore simply refer to two respective sets of program modules, and two respective ways of connecting the program modules. But note that a second configuration of a running application can use many of the same program modules as a first configuration of the running application. In other words, the first and second configurations of the running application may share many of the same in-memory program modules. Hence, the first and second configurations of a running application are not meant herein to necessarily refer to two entirely-distinct and side-by-side instances of application code in memory.

In the terminology used herein, a "data item" refers to a runtime instantiation of a type of data. The "type" of that data item, in turn, identifies its kind or category, which, in turns, governs how the data item is interpreted by a processor. A data item having a single element has a primitive type, e.g., integer, float, etc. A data item having two or more elements has a composite data type, e.g., array, tuple, etc. Each element of a composite data item has its own data type. A "schema" is a description that defines at least one data item's type. In other words, it constitutes a template or archetype that describes the meaning and format of a piece of data and that defines how that piece of data should be interpreted across a data center. For example, a schema of a composite data item may indicate that it includes two component fields having associated names, each having a particular type (e.g., string and integer, respectively). In some environments, a schema is formatted to work across different computer languages. In some environments, a schema can have plural versions. Two versions of a schema provide two respective ways of defining a data type, the second version typically created as an update to the first version. In a cloud computing environment, schemas accommodate communication of data items within the cloud computing environment.

In one non-limiting scenario, a search engine uses a running application to perform its search operations. In that context, the program modules perform respective subtasks within an overarching search operation. For instance, one program module can expand an input query to include synonymous formulations of the query, another program module can perform semantic analysis on the input query to discover its underlying intent, another program module can perform an item-retrieval function, another program module can perform an item-ranking function, and so on. Here, the running application performs work on a query-by-query basis, and endeavors to deliver output results in a timely manner (meaning that the work that is performed is highly latency-sensitive). More generally stated, a running application can perform operations with respect to any environment-specific work items in a queue of work items.

By way of introduction, FIGS. 1-4 show two examples of the operation of a runtime environment 102 upon receiving new program code. The new program code provides modifications to one or more program modules in a running application X. To simplify explanation, assume below that a single server or server cluster in the data center implements the running application X. This implementation reduces serialization and network costs associated with running application code, e.g., by avoiding the transfer of data between machines (or, more generally, between separate processes in memory). Serialization cost refers to the amount of time that it takes a runtime management system to package data for transfer between distinct processes in memory. Network cost refers to the amount of time that it takes the runtime management system to transfer data over a communication conduit. But in other cases, two or more servers or server clusters implement application code as two or more interrelated processes. Further note that the examples will be framed in the illustrative and non-limiting context in which the running application X is a search-related process that handles queries. In a more general context, the application X can perform any type of environment-specific operations, partitioned into any environment-specific units of work.

Referring first to FIG. 1, assume that the runtime environment 102 initially hosts a first configuration (v.1) of the running application X in memory, corresponding to a current (most up-to-date) configuration of the running application X. A query-managing component of the runtime management system (not shown in FIG. 1) assigns incoming queries to the first configuration of the running application X. For instance, a query queue 104 includes at least queries $q_1$, $q_2$, and $q_3$, which the query-managing component has assigned to the first configuration of the running application X. As will be described in greater detail below, once a query has been assigned to a particular configuration of the running application X, the runtime environment 102 will continue to use that configuration for all operations performed on that query. After an update has occurred, the query-managing component will begin assigning new incoming queries to the updated configuration of the running application X.

A manifest-managing component of the runtime management system (not shown in FIG. 1) creates an application manifest 106 for the first configuration of the running application X as part of a process by which all or part of its application code is initially loaded into memory. The application manifest 106 describes the program modules that compose the first configuration of the running application X.

The application manifest 106 also describes the manner in which the program modules in the running application are linked to each other, e.g., using a dispatch table.

The running application X may include hundreds, thousands, etc. of program modules. To simplify the explanation, however, FIG. 1 shows only two representative program modules (108, 110) in the running application X. Assume that a first program module ($PM_1$) 108 includes an invocation of a function $F_1$, and, as such, will be referred to below as the calling program module. Assume that a second program module ($PM_2$) 110 implements the function $F_1$ itself, and is therefore referred to as a called program module. Each of these program modules (108, 110) can include additional functionality, but a description of that functionality is omitted herein to facilitate explanation.

More specifically, assume that the function $F_1$ performs an operation of any kind, mapping one or more input items to one or more output items. For example, consider the merely illustrative case in which, during execution, the function F receives a complex input data item. Further assume that the input data item includes two fields: a first field that specifies an input keyword, and a second field that describes a location at which the user submitted the keyword. In one merely illustrative case, assume that the function maps the input data item into an output data item that specifies an output result that expresses an intent of the user's search query.

In the above example, a type $T_1$ of the input data item refers to its kind, here corresponding to a composite piece of data having two fields. A schema describes this composite data type, e.g., by specifying that it includes two fields having respective names, and having respectively component data types. More specifically, assume that the calling program $PM_1$ 108 uses a first schema $ST_1$ (v.1) to define the type $T_1$. Assume that the called program module $PM_2$ 110 uses same version of the schema to define the type $T_1$ (i.e., $ST_1$ (v.1)). In other words, these two program modules (108, 110) are in agreement as to what a data item associated with the type $T_1$ represents and how it should be interpreted. While these program modules (108, 110) make reference to a commonly-defined type $T_1$, neither program module itself embodies an understanding of this fact. For instance, the first program module $PM_1$ 108 is "blind" to the fact that the second program module $PM_2$ defines the type $T_1$ in the same manner that it does. Likewise, the called program module $PM_2$ 110 has no advance knowledge of the format of data that it will receive from any calling program module.

A mapping component 112 includes mapping logic that maps a call to the function $F_1$ by the first program module $PM_1$ 108 to an identity of the program module (here $PM_2$ 110) that contains the function $F_1$. As will be described below, the mapping component 112 includes mapping logic that is specified by the current version of the application manifest 106, e.g., in the form of a dispatch table. Later figures and accompanying explanation set forth illustrative implementations of the mapping component 112.

In response to an output result provided by the mapping component 112, the runtime environment 102 invokes the second program module $PM_2$ 110. In doing so, it sends the data item (of type $T_1$) to the second program module $PM_2$ 110. The second program module $PM_2$ receives the data item, performs its native function based on the data item, and then generates an output result. Although not shown, the running application X may pass the output result to one or more downstream program modules (not shown).

At some later stage, assume that the runtime environment 102 receives a new DLL that contains a revision of the code associated with the second program module PM$_2$ 110. In response, the runtime environment 102 creates a second version (v.2) of the application manifest and provides a second configuration of the running application X. According to one aspect, the runtime environment 102 provides the second configuration of the running application without suspending the first configuration (v.1) of the running application X. Further note that the runtime environment 102 provides the second configuration of the application X by selectively compiling and loading only those code components that are impacted by the update. In other words, the updating process does not involve reloading all of the program modules that make up the running application X. This further means that the first configuration of the running application X and the second configuration of the running application X share in-memory program modules. The two configurations do not correspond to two entirely-separate instantiations of application code running in two entirely-separate portions of memory.

Figure 2:
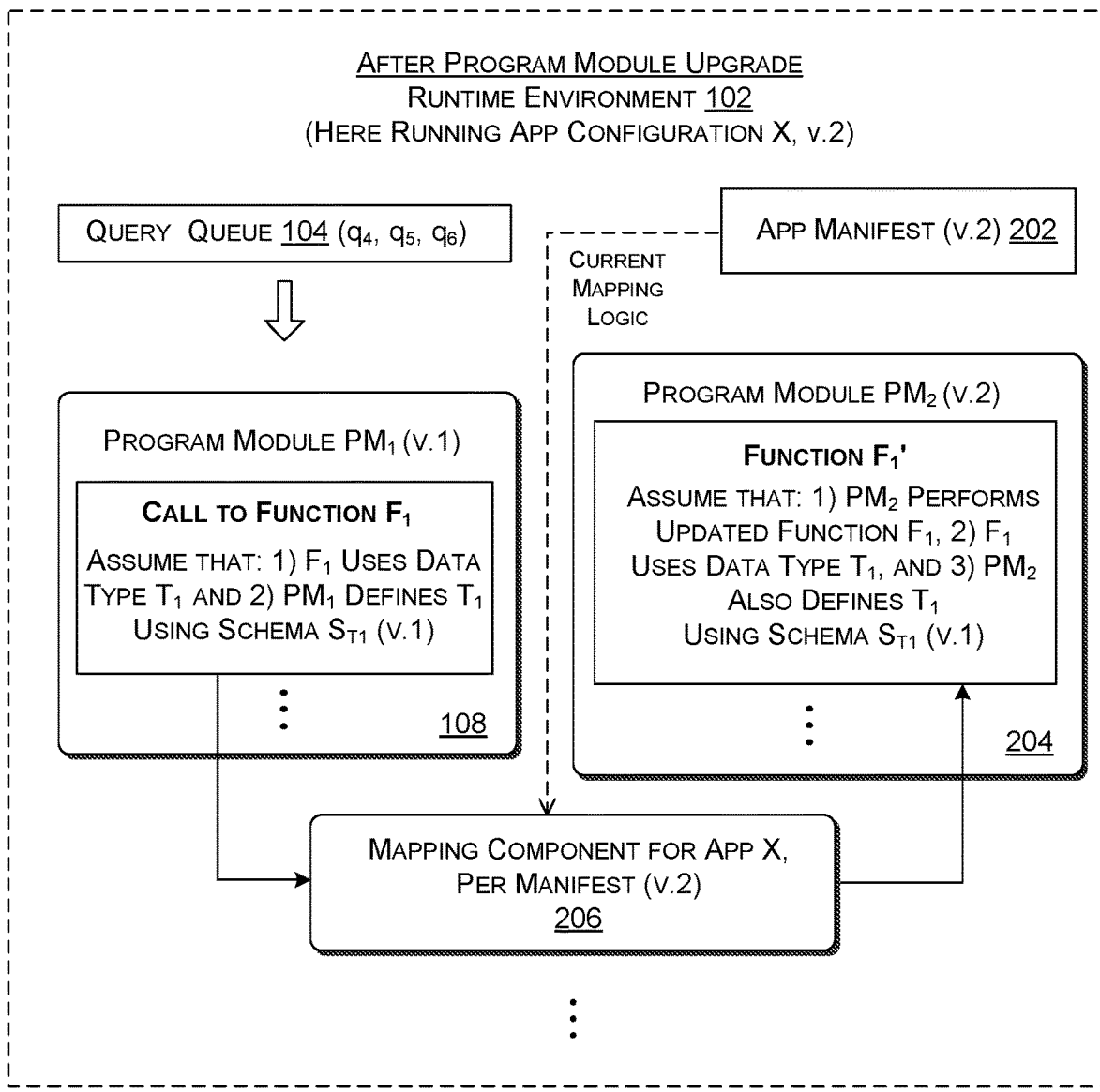

FIG. 2 shows the runtime environment 102 following the update that is made to the running application X. The runtime environment 102 includes a second version (v.2) of the application manifest 202. Assume that the query queue 104 at this time includes at least queries $q_4$, $q_5$, and $q_6$. The query-managing component (not shown) assigns these queries to the second configuration of the running application X because this is now the current configuration of the running application. It is possible, however, that, at this time, the runtime environment 102 is currently using the first configuration of the running application X to finish up its processing of queries $q_1$, $q_2$, and $q_3$, which were previously assigned to the first configuration of the running application X.

At this point in time, the first program module PM$_1$ 108 remains the same. That is, the first program module PM$_1$ 108 corresponds to version v.1 of this component. This means that, in providing the second configuration of the running application X, the runtime environment 102 does not need to reload the first program module PM$_1$ 108; the first configuration and the second configuration utilize the same instantiation of program code stored in memory. On the other hand, the second configuration of the running application X now includes a second version (v.2) of the second program module PM$_2$ 204. Assume that the second version of the program module PM$_2$ 204 includes a change to the logic used to generate its output result, e.g., by including a change to the equation that it uses to calculate its output result. But assume that the second version of the program module PM$_2$ 204 does not otherwise change the data type(s) associated with its input item(s) and output item(s), relative to the first version (v.1) of this program module 110. That is, the second version of the second program module PM$_2$ 204 continues to use the schema ST$_1$ (v.1) to define the data type T$_1$.

An updated instance of the mapping component 206 maps the invocation of the function F$_1$ by the first program module PM$_1$ 108 to an identity of the second version (v.2) of the second program module PM$_2$ 204. To perform this task, the mapping component 206 leverages updated mapping logic specified by the second version of the application manifest 202. That logic links the first program module PM$_1$ 108 to the second version of the second program module PM$_2$ 204.

Figure 3:
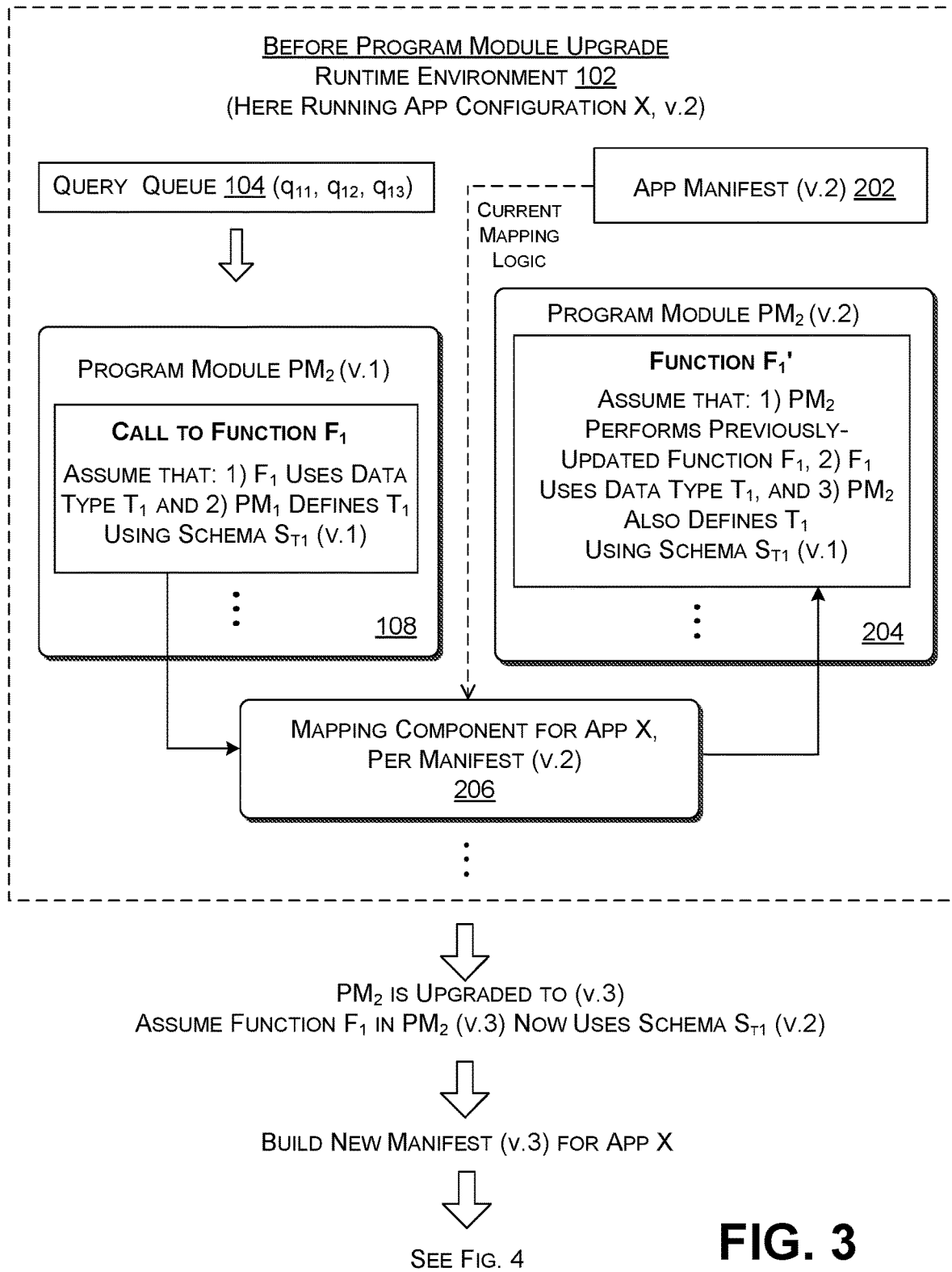
FIGS. 3 and 4 together show a second example of a technique for updating a running application.
Figure 4:
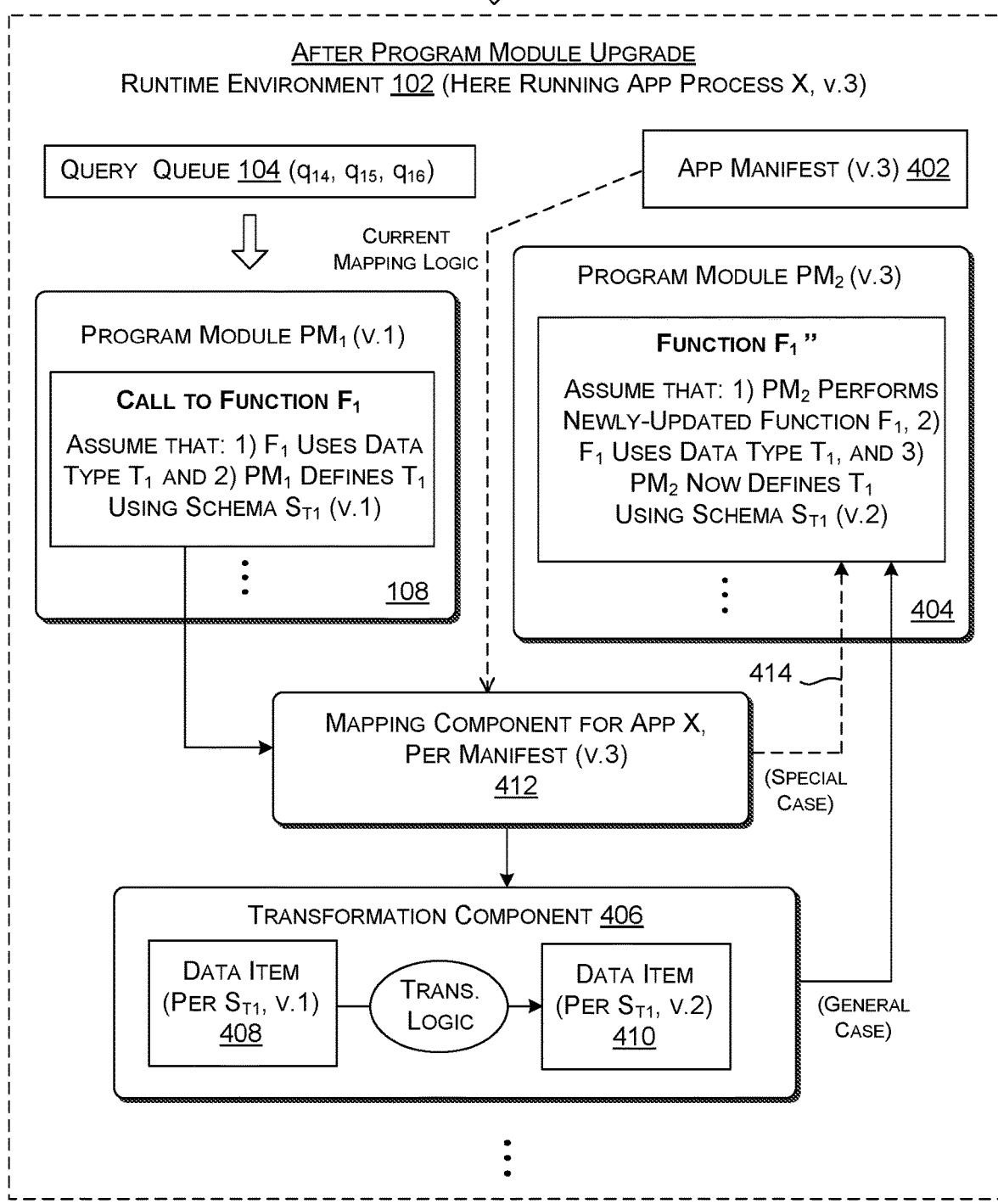

FIGS. 3 and 4 show a second example of the operation of the runtime environment 102. Starting with FIG. 3, again assume that the runtime environment 102 hosts the second configuration of the running application. At this point in time, assume that the query queue 104 contains at least queries $q_{11}$, $q_{12}$, and $q_{13}$, which the query-managing component (not shown) assigns to the second version of the application manifest 202, because this is the most up-to-date version of the application manifest.

Next assume that the developer provides program code that will be used to load a third version (v.3) of the second program module PM$_2$. Assume that third version of program module PM$_2$ contains not only an update to the internal logic of the program module PM$_2$, but a change to a data type used by the third program module PM$_2$. That is, the developer modifies the program module PM$_2$ such that it will operate on input data items have a data type T$_1$ described by a second schema ST$_1$ (v.2). To provide a concrete example, again assume that the first schema defined the data type T$_1$ as having two fields: a keyword field and a location field. Assume that the second schema ST$_1$ (v.2) adds a new field to the type T$_1$ that describes a time of day at which the end user submitted his or her query. The developer also changes the code of the second program module PM$_2$ so that it maps values associated with all three fields to an output result.

FIG. 4 shows the runtime environment 102 after the second version of the second program module PM$_2$ has been loaded and linked, which produces a third configuration of the running application X. The runtime environment 102 now includes a third version of the application manifest 402. The query queue 104 now stores queries $q_{14}$, $q_{15}$, and $q_{16}$, which the query-managing component (not shown) assigns to the third version of the application manifest 402.

Assume that the third configuration of the running application X continues to include the first version (v.1) of the first program module PM$_1$ 108. As such, the runtime environment 102 does not reload this program module PM$_1$ 108 in providing the third configuration of the running application X. Nor does the runtime environment 102 need to shut down the second configuration of the running application X in the course of loading the third configuration of the running application.

The third configuration of the running application X now includes a third version (v.3) of the second program module PM$_2$ 404. As noted above, this version of the program module PM$_2$ 404 now defines the type T$_1$ of the function F$_1$ using the second schema ST$_1$ (v.2). There is now a mismatch between the manner in which the first program module PM$_1$ 108 and the second program module PM$_2$ 404 define the type of the data item that is passed to the function F$_1$ in the second program module PM$_2$ 404. In the concrete example specified above, the first program module PM$_1$ 108 may send a data item that includes values for a keyword field and a location field. But it does not include a value for a time field because the first program module PM$_1$ 108 does not "know" about this new field. But the function F$_1$ as defined by the second program module PM$_2$ nevertheless expects a data item that includes this field.

The runtime environment 102 can address this issue in at least two ways. FIG. 4 emphasizes the first of these ways. Assume that the runtime environment 102 includes a transformation-creating component (not shown in FIG. 4) that produces a transformation component 406 when the third version of the second program module PM$_2$ 404 is loaded. The transformation component 404 includes transformation logic for transforming a data item 408 that conforms to the first schema (ST$_1$, v.1) to a data item 410 that conforms to second schema (ST$_1$, v.2). For instance, in the concrete example stated above, the transformation component 406 can add a third field to the data item received from the first program module PM$_1$ 108 and add a value to that field, such as a value of zero (in one non-limiting case) or some other default time value (because, in this example, the missing field pertains to time). More generally, the transformation component 406 can apply any kind of transformation to the received data item 408, including: adding fields; removing fields; rearranging (or more generally reformatting) existing information in the first data item 408, and so on. As an example of a reformatting operation, a transformation component can change a specified date from one format to another. Further, as noted above, in certain cases, the transformation logic can also add a value to a field and/or change an existing value in a field, e.g., by both adding a new field and adding a default value for that field. In certain cases, the transformation logic can even supply a "correct" value of information that is needed rather than a default value, e.g., in this case, by inserting a current time into a time field.

In one implementation, the transformation-creating component (not shown) instantiates the transformation component 406 based on explicit instructions specified by the developer or other individual in the second schema $ST_1$ (v.2) that describes the updated data type. Note that the developer can alternatively, or in addition, specify these instructions in any other document, files, etc. besides the second schema. Alternatively, or in addition, in some cases, the transformation-creating component can generate the transformation component 406 based on transformation logic specified in a default rule, without requiring the developer or other individual to explicitly specify that transformation logic in a schema or elsewhere. Additional illustrative details regarding the operation of the transformation-creating component will be provided below.

The runtime environment 102 also provides a mapping component 412 that includes mapping logic specified by the third version of the application manifest 402. In one manner of operation, the mapping component 412 maps the first program module's invocation of the function $F_1$ to an identifier ($TC_{ID1}$) that specifies the identity of the transformation component 406. This allows the runtime environment 102 to access the transformation component 406. The transformation component 406 then maps the data item 408 as received to the output data item 410. The transformation component 406 can finally send the transformed data item 410 to the third version (v.3) of the second program module $PM_2$ 404. The transformation component 406 can identify the third version of the program module 404 using mapping logic contained in the mapping component 412 or based on its own internal mapping logic. In both cases, this mapping logic derives from information specified in the third version of the application manifest 402.

Finally, a path 414 indicates that the mapping component 412 can alternatively send the data item 408 as received from the first program module $PM_1$ 108 to the second program module $PM_2$ 404 without transforming it. As will be described in greater detail below (with reference to FIGS. 17 and 18), the runtime environment 102 can behave in this way when it concludes that the second program module 404 can effectively ignore the fact that the data item 408 that it receives lacks a third field that specifies a time value.

Note that Example 2 was described in the merely illustrative case in which different respective program modules use different respective schemas to define a complex data item of type $T_1$. To repeat, a first version of the schema defines the complex data item as having two fields, while a second version of the schema defines the complex data item as having three fields. This is merely an example used in this disclosure to facilitate explanation. In a more general case, a function $F_1$ can be said to map input data to output data. It has an input interface that specifies the form of input data that it is expecting, and an output interface that specifies the form of the output data it will deliver. With respect to the input interface, a schema associated with the function should be broadly interpreted herein to refer to any characterization of the form of the input data, or any part thereof. This similarly applies to the output interface. The transformation component generally handles the situation in which a calling program module and a called program module define the input and/or output interface associated with a function in an inconsistent manner using different respective schemas.

The techniques described have advantages over alternative ways of updating an application that is composed of plural program modules. One alternative way to update the application is to shut down the running application, relink all of the program modules, and then bring an updated application back on line. This solution is disruptive to customers who interact with the running application, and therefore not satisfactory.

Another alternative way to update an application is by running a production system alongside of an update system. The production system delivers service to clients using an existing version of a running application while the update system loads a new version of the running application. But a data center may not have enough resources (e.g., servers, etc.) to achieve this solution. And even if it does, this solution is wasteful. This solution also requires a routing mechanism that controls access to the two systems.

The techniques in FIGS. 1-4, by contrast, allow a developer or systems engineer to update a running application in piecemeal manner, without shutting an "old" version of the application down, and without running side-by-side "old" and "new" versions of the application. The technique makes efficient use of the resources of a data center while delivering good performance to its clients.

Figure 5:
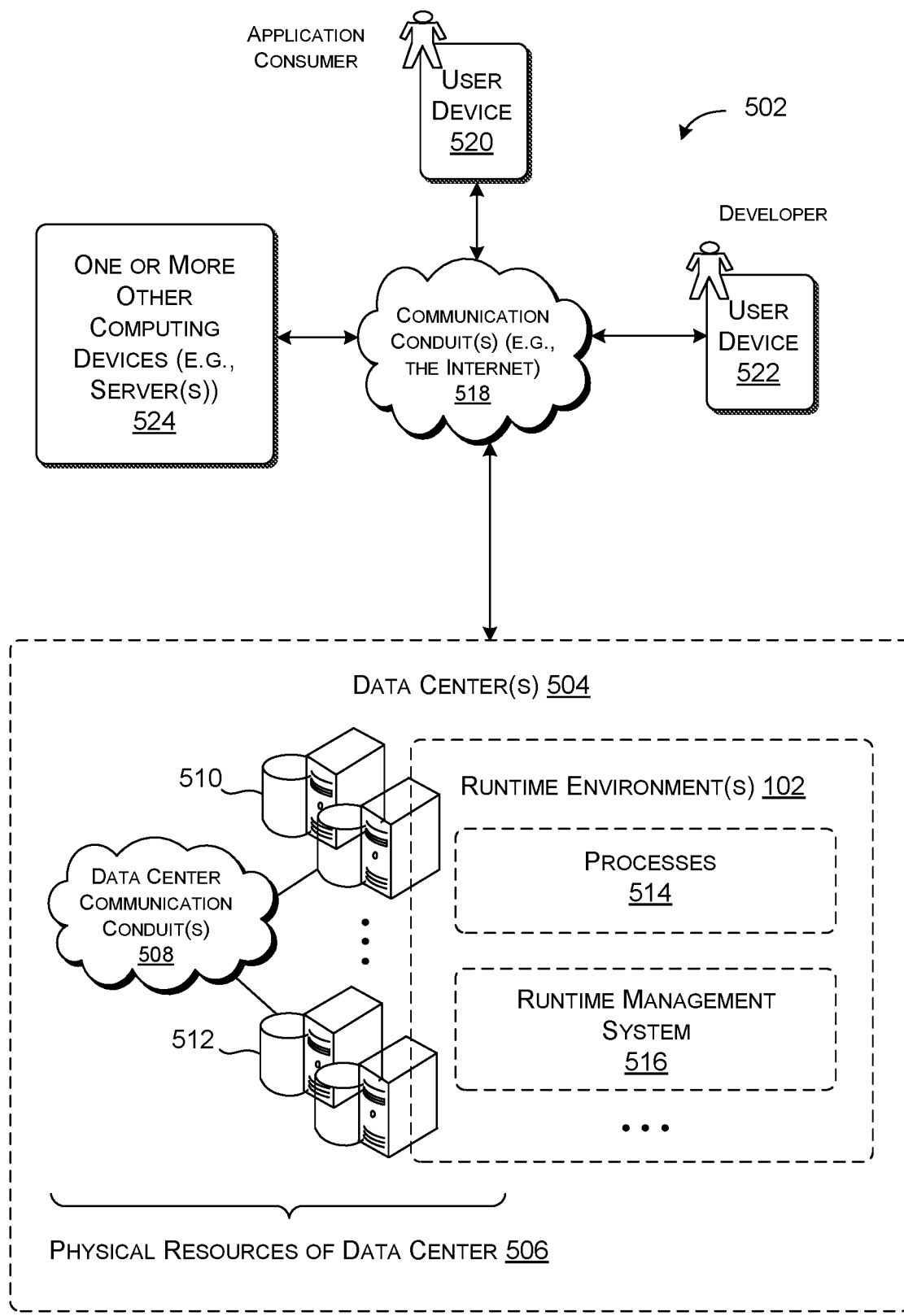
FIG. 5 shows a computing environment for implementing the techniques shown in FIGS. 1-4.

FIG. 5 shows a computing environment 502 for implementing the techniques shown in FIGS. 1-4. The computing environment 502 includes one or more data centers 504 provided at one or more geographic locations. The data center(s) 504 include a collection of hardware resources 506, such as servers (and/or other kinds of computing devices), data stores, communication conduits 508, cooling equipment, equipment racks, and so on. The servers and data stores can be organized into plural clusters of computing devices, such as representative cluster 510 and cluster 512. That is, each such cluster includes one or more servers and one or more storage devices. The communication conduit(s) 508 can include a local area network (including routers, etc.), point-to-point data links, etc.

Collectively, the servers implement one or more runtime environments 102, referred to in the singular below for simplicity. The runtime environment 102, in turn, can include one or more processes 514 and a runtime management system 516. Each process corresponds to at least part of an instance of a running application (and associated data), and may include one or more program modules. Each program module, in turn, may correspond to a runtime instantiation of a DLL or other kind of software module. The runtime management system 516 manages the processes 514. As will be clarified below, for example, the runtime management system 516 performs tasks such as creating application manifests, creating transformation logic, loading (and dynamically linking) program modules, and so on. When viewed from a more encompassing perspective, the runtime management system 516 shown in FIG. 5 corresponds to an encompassing runtime management framework that manages processes across the entire data center(s) 504.

In some implementations, the runtime management system 516 attempts to deploy an instantiation of application code in the fewest number of processes which run on the fewest number of physical resources, e.g., in one case on a single server or single cluster. For example, assume that the data center(s) 504 host two applications, X and Y. The runtime management system 516 may attempt to allocate an instance of a corresponding running application X (which runs the entirety of application X's code) to the first server cluster 510 and a corresponding instance of a second running application Y (which runs the entirety of application Y's code) to the second server cluster 512. By virtue of this strategy, the runtime management system 516 can reduce the interaction between separate processes and separate machines in the course of carrying out the functions of an application. These interactions are expensive because they involve time-consuming and resource-intensive serialization and network operations. As described above, a running application incurs serialization costs when it packages data for transfer between distinct processes in memory. A running application incurs network costs in the course of the transfer of data over a communication conduit. But in other cases, the runtime management system 516 can conclude that it is appropriate to break a running application up and allocate it to two or more processes that interact with each other, running on separate respective machines. One strategy for allocating processes to data center resources is described in commonly-assigned U.S. patent application Ser. No. 16/540,896 (the '896 Application) to Robert Goodwin, et al., filed on Aug. 14, 2019, and bearing the title, "ORCHESTRATION AND SCHEDULING OF SERVICES." The '896 Application is incorporated by reference herein in its entirety by reference.

The above allocation strategy has been described with respect to a single instantiation of a running application. But, as described above, the data center(s) 504 may simultaneously host plural versions of a running application running on plural servers. For instance, the search engine can run its query-processing operations using plural instances of the same version of the running application X. This allows the search engine to process queries in parallel. Further note that any single server can perform operations in parallel using various techniques, e.g., by utilizing well-known multithreading techniques, etc.

Other computing devices may interact with the data center(s) 504 via one or more communication conduits 518. The communication conduit(s) 518 may include a wide area network (e.g., the Internet). For instance, an end user (application consumer) may use a user computing device 520 to submit a query to a search engine hosted by the data center(s) 504. In response, the search engine generates and delivers search results to the user, for consumption by the user via the user computing device 520. A developer or other individual may use another user computing device 522 to submit a new program to the data center(s) 504, upon which the runtime management system 516 loads a corresponding new program module into an existing running application. The code of the new program may be expressed as one or more DLLs. In other cases, a new program may represent a new or modified application (as a whole). Any user computing device can correspond to any of: a desktop personal computing device, a laptop computing device, any type of handheld computing device (such as a smartphone), a wearable computing device, a mixed-reality device, a game console, and so on, or any combination thereof.

FIG. 5 also indicates that the computing environment 502 can include one or more other computing devices 524, such as one or more servers coupled to the communication conduit(s) 518. These computing device(s) 524 can be considered separate from the data center(s) 504, that is, "outside" the data center(s) 504 that host a search engine or other application(s). Alternatively, or in addition, at least some of the computing device(s) 524 can be considered as internal to the data center(s) 504. As a more general point, any of the functions described in connection with FIGS. 1-4 can be performed inside and/or outside the data center(s) 504. Further note that the principles described above with reference to FIGS. 1-4 do not require the use of the data center(s) 504. For instance, another implementation can implement the principles in whole or in part using a local user computing device, or a combination of two or more local computing devices.

Figure 6:
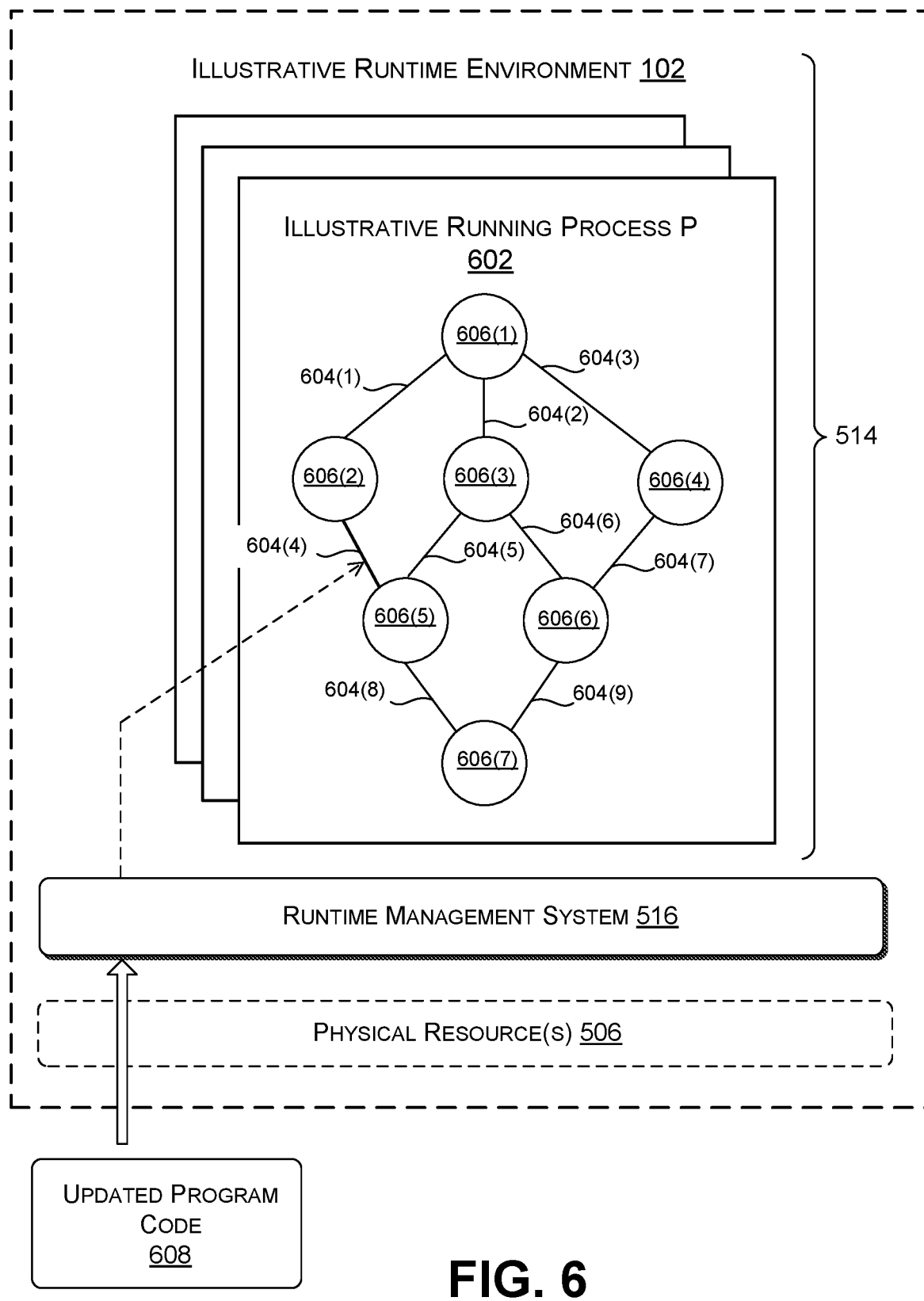
FIG. 6 shows illustrative aspects of a runtime environment provided by the computing environment of FIG. 5.

FIG. 6 shows illustrative aspects of the runtime environment 102 hosted by the computing environment 502 of FIG. 5. The runtime environment 102 hosts one or more processes 514, including the representative process P 602. Assume here that the process P 602 represents all of functionality associated with one instance of a running application X, although this may not be true in general. Process P 602 operates in memory allocated to it, e.g., as provided by a single server or a single server cluster, etc.

The runtime environment 102 represents the process P 602 as an acyclic directional graph (DAG). FIG. 6 shows an illustrative DAG as a collection of data nodes (circles) linked together by edges (lines connecting the circles). The circles represent instances of data, while the edges represent program modules (also referred to as services herein) that operate on the instances of data. Generally, information flows from top to bottom in the representative DAG shown in FIG. 7.

More specifically, the process P 602 shown in FIG. 6 includes nine program modules 604(1), 604(2), . . . , 604(9). Note, however, that this is a simplified example; in actual practice, the process P 602 can include hundreds, thousands, etc. of program modules. Each program module maps input data to output data. In some cases, the output data of a program module serves as input data for one or more other "downstream" program modules. FIG. 6 represents seven instances of data, 606(1), 606(2), . . . , 606(7). For instance, a program module 604(4) receives an instance of input data 606(2), and then performs some operation on the input data 606(2) to generate an instance of output data 606(5). A subsequent program module 604(8) consumes the data 606(5) as input data.

The use of a DAG to organize program modules is merely illustrative. Other implementations of the principles described herein can organize program modules using other data structures and strategies.

The runtime management system 516 updates the process P 602 upon the receipt of each instance of new program code. Here, assume that the runtime management system 516 receives an instance of updated program code 608 that is used to instantiate an updated version of the program module 604(4). The runtime management system 516 responds to the receipt of the new program code 608 by creating a new version of the application manifest, and then loading and linking the corresponding updated program module 604(4) into the process P 602. In this operation, the runtime management system 516 need not reload all program modules in the application X 602. Nor need the runtime management system 516 shut down the process P 602 while the upgrade is being performed. Although not shown, note that the runtime management system 516 repeats the above loading and linking operation for any process across the data center(s) 504 that uses the program module 604(4).

By virtue of the above-described approach, the runtime management system 516 expedites the deployment of an updated process P 602. This is because the approach incrementally makes changes to the process P 602, without requiring reloading (and relinking) the entire set of program modules in the process P 602 after each change. The approach also makes efficient use of the physical resources 506 of the data center(s) 504. This is because the approach dynamically makes changes to a live production system, rather than implementing updates on a dedicated (and separate) deployment system. The approach also offers good user experience. This is because the approach allows a user to continue to work with an application while it is being upgraded (preferably without any noticeable degradation in performance), rather than temporarily disabling the application during a loading process.

The use of schema-transformation logic described in FIGS. 3 and 4 also provides a convenient and efficient way for a developer to introduce schema changes into a process P 602. That is, as described above, a schema change can impact plural program modules that use this schema. The approach described herein automatically supplies each program module with a data item having the format it is expecting. It further performs these transformations in an efficient and consistent manner across the resources of the data center(s) 504, which can host plural applications, and plural instantiations of each application.

The merit of the approach described herein can also be framed in relation to alternative approaches. In one alternative approach, the developer might find it necessary to make changes to plural DLLs of an application to ensure that they are consistent with a new version of a schema, and then reload the updated application. In addition, or alternatively, the developer may need to coordinate with other developers to ensure that they have updated their DLLs to work with the new schema. This alternative approach is cumbersome, time-consuming, and prone to error. In addition, this approach requires the developer to have knowledge of other program modules in the process P 602, besides the immediate program module which he or she has modified. It also requires the developer to have some knowledge of the overarching organization of program modules in the process P 602. Not every developer can be expected to possess this knowledge, particularly in the case in which a running application may use hundreds (or more) of program modules. And even if he or she possesses this knowledge, the task of updating plural program modules in a manual manner is, as said, inefficient and prone to error, and may require complex and cumbersome coordination among multiple developers. The approach described herein addresses these problems by automating aspects of the task of integrating schema changes into a running application in a technically efficient and unobtrusive way. This automation frees the developer to concentrate on introducing new application-level logic to a running application rather than delving into system-level details regarding how these features are implemented by the underlying runtime environment 102 and resources 506 of the data center(s) 504.

In another alternative approach, a developer may generate a DLL that includes two or more versions of a single function. At runtime, the corresponding program module can perform internal switching to direct a function call to the correct version of the function. But this approach complicates the DLL, and increases the amount of developer effort required to create and maintain the DLL. The approach described herein does not require the developer to create multipurpose DLLs in the above-described manner; rather, the approach relies on transformation logic to automatically make appropriate formatting changes "outside" the DLLs, such that program modules receive the data in the form they are expecting.

Figure 7:
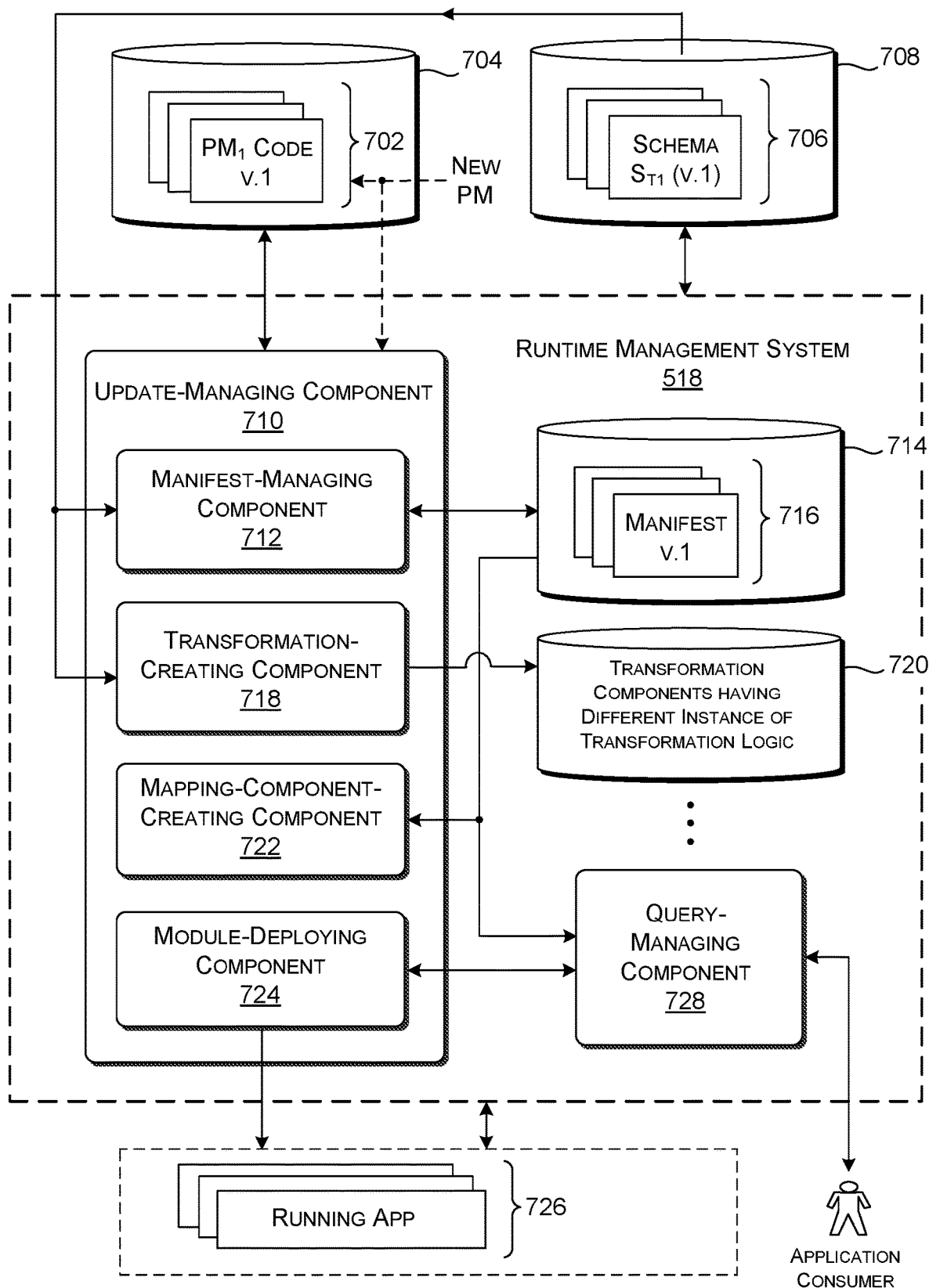
FIG. 7 shows illustrative aspects of a runtime management system used by the runtime environment of FIG. 6.

FIG. 7 shows illustrative aspects of the runtime management system 516 introduced in the previous figures. The runtime management system 516 includes or has access to a library of software components 702 (e.g., DLLs) in a data store 704. Each software component can be expressed in any computer language(s). Each software component, when instantiated in the runtime environment 102, corresponds to a program module in a running application. The runtime management system 516 also includes or has access to schemas 706 in a data store 708. Each schema describes a data type or types, or broadly stated, can be said to define data of any scope. Each schema can be expressed in any form, including a declarative form. In one implementation, a schema can be expressed in a form that enables it to be interpreted by different program modules that use different native computer languages.

An update-managing component 710 performs various tasks involved in loading updated program code into a running application in memory. For instance, a manifest-managing component 712 produces a new application manifest upon receipt of a new program. The application manifest describes the program modules that will compose an updated running application, upon incorporating a modified program module in the running application. The application manifest also describes the connections among the program modules. In other words, in the context of FIG. 6, the application manifest describes a DAG that represents the updated running application. Alternatively, the manifest-managing component 712 can update only a part of a preexisting application manifest that will be impacted by the new program, leaving another part of the preexisting manifest unchanged. This operation also yields a new version of an application manifest.

The manifest-managing component 712 stores each new application manifest that it creates in a data store 714. At any given time, the data store 714 can store plural application manifests 716 for a single running application. For example, the data store 714 can store two or more versions of an application manifest for a running application X. The manifest-managing component 712 can also delete or otherwise deactivate any application manifest to which queries are no longer being assigned.

A transformation-creating component 718 generates a transformation component (having particular transformation logic) upon loading a new program module for the case described in Example 2 above (in FIGS. 3 and 4). Recall that this case corresponds to the situation in which a calling program module and a called program module reference the same type, but define that type in different respective ways. In one implementation, the transformation-creating component 718 performs its task by instantiating transformation instructions specified in a schema associated with a data type under consideration. For instance, the schema can include program code written in any computer language(s) that performs transformation operations when instantiated. Alternatively, or in addition, the schema can declaratively specify transformation operations, and the transformation-creating component 718 can generate a corresponding transformation component by reference to a set of logic-creating rules.

In any case, the transformation-creating component 718 can store each transformation component that it creates in a data store 720. The transformation-creating component 718 can furthermore associate an identifier with each transformation component that it creates, allowing a mapping component to access it in appropriate circumstances. When needed, a transformation component uses an instance of translation logic to map an input data item to an output data item, or more broadly stated, to map input data to output data.

A mapping-component-creating component 722 creates a mapping component to be used to route data items between program modules in the runtime environment 102. In one case, the mapping-component-creating component 722 can generate an instance of the mapping component for a particular version of a running application by including mapping logic specified in the appropriate version of the application manifest. In addition, the mapping-component-creating component 722 can link the mapping logic specified in the application manifest to transformation component identifiers specified in the data store 720.

A module-deploying component 724 loads a new program module (associated with the new program code) into memory, linking it to one or more existing program modules in a running application. FIG. 7 generally indicates that the runtime environment 102 can host a plurality of running applications 726, distributed across its physical resources in any manner. The module-deploying component 724 can also remove any program module that is no longer being used by any active running application.

A query-managing component 728 associates each incoming query with a current version of an application manifest. In one implementation, the query-managing component 728 can perform this task by coupling the query with an identifier or pointer that designates the current version of the application manifest. The association between a query and a particular version of a running application remains in place until the processing of that query has completed. In other words, the query-managing component 728 will not reassign an in-process query to a new application manifest even if that new application manifest is created prior to the termination of the processing of the query.

FIG. 8 is a timeline that shows an illustrative sequencing of operations that occur in the runtime environment 102 of FIG. 6. In block 802, the runtime environment 102 processes queries (e.g., queries $q_1$, $q_2$, $q_3$) using a first version of an application manifest and an associated first configuration of a running application. In block 804, the runtime management system 516 creates a second version of an application manifest and a second corresponding configuration of the running application. In block 806, the runtime environment 102 processes queries (e.g., queries $q_4$, $q_5$, $q_6$) using the second configuration of the running application. Note that block 806 commences upon a signal that indicates that the loading of the second configuration of the running application has completed (e.g., upon the termination of block 804). In block 808, the runtime management system 516 optionally removes the first version of the application manifest. The runtime management system 516 can also optionally remove any unused program modules from memory. Note that block 808 commences only after all the queries that have been previously associated with the first version of the application manifest have been processed. The query-assignment protocol described in FIG. 8 is useful to prevent different configurations of a running application from operating on a same query; this would break the contracts between functions specified by a single application manifest, and may lead to the failure of the running application.

FIG. 9 shows a version of a schema that describes a data type $T_1$, generally tracking Example 2 described above in connection with FIGS. 3 and 4. Recall that this version (v.2) of the schema includes three fields, here generically denoted as fields K, L, and M. The schema includes a description of each field. The schema also includes instructions 902 that describe how a transformation component is to translate a data item expressed in an immediately-preceding schema version (here, version v.1) to the second version of the schema. The schema may express the instructions 902 using any computer language, or in high-level language-agnostic declarative form. The fact that instructions apply to an immediately-prior version (v.1) of the schema may be implicit, or it may be explicitly specified in the schema. The runtime management system 516 will ignore the instructions if the calling program module also uses the second version of the schema. It can also optionally ignore the instructions if the calling program uses some version of the schema other than the current version (v.2) or the immediately preceding version (v.1).

FIG. 10 shows a third version of the schema. This schema specifies the same three fields as the first schema, and also includes instructions 1002. In this case, however, the instructions 1002 have plural sub-instructions. A first instance of sub-instructions describes how to transform a data item that emanates from a calling program module that uses a first version (v.1) to define the data type $T_1$. A second instance of sub-instructions describes how to transform a data item that emanates from a calling program module that uses a second version (v.2) of the data type $T_1$.

By applying an appropriate instance of sub-instructions in the schema, the runtime management system 516 can transform a data item from a source form to a target form in one step, rather performing this operation in a piecewise manner. For example, to transform the data item from version v.1 to version v.3, the runtime management system 516 can apply a single transformation, rather than transforming the data item from version v.1 to version v.2 (e.g., using the schema shown in FIG. 9), and then transforming the resultant data item from version v.2 to version v.3 (e.g., using instructions that appear in another schema for version v.3 that maps between version v.2 and version v.3). In another implementation, however, the runtime management system 516 can perform updates in this exactly this serial manner.

FIG. 11 shows a first way of updating a mapping component 1102, or, more generally stated, a first way of updating mapping logic that derives from an application manifest. Prior to the updating operation, assume that the mapping component 1102 uses a first version of mapping component resources 1104. For instance, the mapping component resources 1104 may correspond, in part, to mapping logic specified by a first version of an application manifest. In this first example, the updating operation updates the mapping component resources 1104 in their entirety to produce an updated mapping component 1102' having updated mapping component resources 1104'. For instance, the updating operation may entail creating a new application manifest that includes an updated list of program modules in a second configuration of the running application, together with a description of all the connections among the various pairings of program modules. In other words, in the context of FIG. 6, the updating operation in this implementation regenerates a complete description of a DAG associated with the second configuration of the running application. If there are N program modules in a running application, the task of creating a new application manifest involves potentially describing N×N possible connections.

FIG. 12 shows a second way of updating a mapping component 1202 that is more efficient than the first way (of FIG. 11) because it only updates those parts of its mapping component resources 1204 that are impacted by whatever change is made to the first configuration of the running application. That is, an updating operation 1206 in this implementation produces an updated mapping component 1202' having updated mapping component resources 1204'. Those updated resources 1204' include a portion 1208 that is updated (relative to the first version) and a portion 1210 that is not updated.

Examples of the first and second ways of updating mapping component resources are provided below with respect to FIGS. 13-16. Starting with FIG. 13, this figure shows an application manifest 1302 for a first configuration of a running application X. The application manifest 1302 includes a listing 1304 of program modules within the running application X. The application manifest 1302 also includes mapping logic 1306. The mapping logic 1306 describes the connections between program modules in the current version of the running application X.

A mapping component (not shown) utilizes the mapping logic 1306 to map a call to a function to a called program module that implements that function. For instance, in the specific example of FIG. 13, assume that a calling program module invokes a function $F_1$. The mapping component receives an identifier from the calling program module associated with this function $F_1$. The mapping component uses this identifier to locate an entry 1308 in the mapping logic 1306. That entry 1308 maps the identifier for $F_1$ to an identifier associated with a first version of a program module $PM_2$ (v.1) that provides the function $F_1$. The mapping component then uses this identifier ($PM_2$, v.1) to access $PM_2$, v.1. This example makes the default assumption that all program modules that call the function $F_1$ use the same schema to describe a data type $T_1$, and therefore it is not necessary to discriminate among callers of the function $F_1$. This, however, may not be true in all environments.

As described above, the mapping logic 1306 can be implemented as a dispatch table or other kind of mapping mechanism. Further note that a process (not shown) can assign names of functions and modules to respective ordinals, and then use these ordinals to access the mapping logic 1306, e.g., rather than full original string names. This provision is useful to expedite the lookup operation, and also to make serialization more efficient (e.g., for the case in which mapping logic is transferred to another process, machine, etc.).

Figure 14:
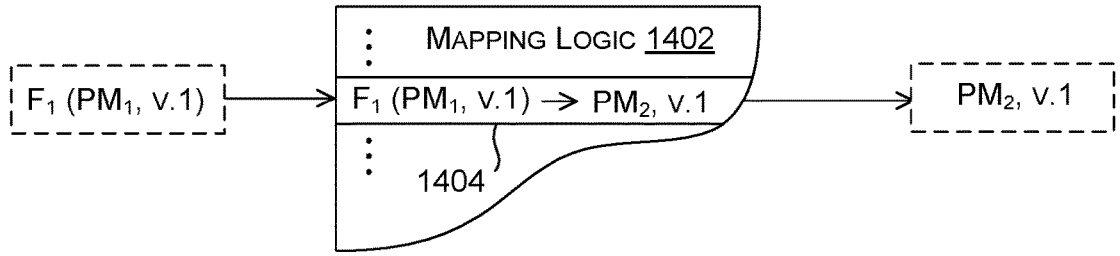

FIG. 14 shows an example of mapping logic 1402 that performs a more granular mapping compared to the mapping logic 1306 of FIG. 13. In this case, a mapping component (not shown) receives an identifier from the calling program module that identifies a function ($F_1$) that the calling program seeks to invoke. It also receives an identifier that identifies the calling program module itself, including its version. The mapping component uses that information to locate an appropriate entry 1404 in the mapping logic 1402. It then uses that entry 1404 to identify the program module (here, $PM_2$, v.1) that includes the requested function. A different entry (not shown) may point to a different called program module if the input information identifies a different calling program module.

Figure 15:
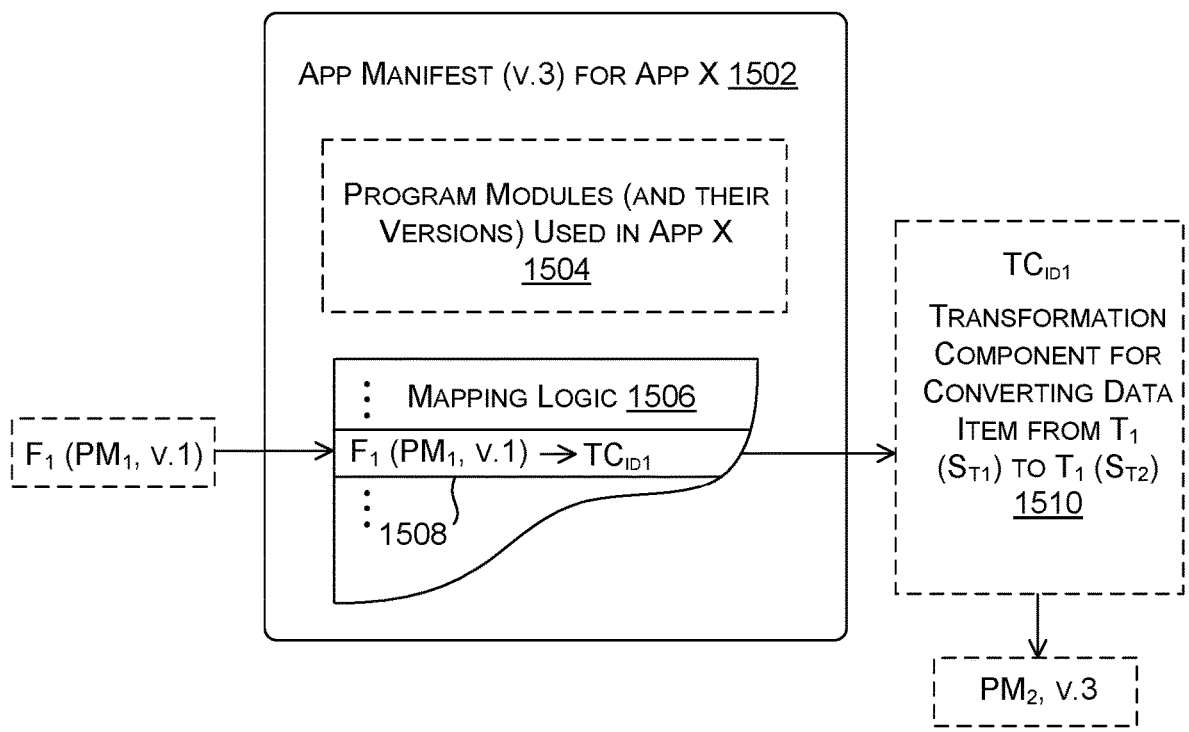

FIG. 15 shows another implementation of an application manifest 1502. Here, the application manifest 1502 includes a listing 1504 of program modules in a second configuration of a running application. It also includes mapping logic 1506 for mapping calls between calling program modules and appropriate called program modules.

In the specific example scenario of FIG. 15, assume the called function $F_1$ manipulates data having a data type $T_1$. Further assume that the calling program module defines the data type $T_1$ with respect to a first schema, and the called program module defines the data type $T_1$ with respect to a second schema. Further assume that a mapping component (not shown) receives identifier information that describes the function ($F_1$) that has been called and the version of the calling program. The mapping component uses that input information to identify an appropriate entry 1508 in the mapping logic 1506. That entry 1508 maps the input information to an identifier ($TC_{ID1}$) associated with a transformation component 1510. In response, the mapping component uses the identifier ($TC_{ID1}$) to access the transformation component 1510. The transformation component 1510, operating as a proxy, then transforms the data item supplied by the calling program module to an appropriate target form, and then passes the transformed data item to the appropriate called program module. This example is merely illustrative; other implementations can use other routing strategies to access an appropriate transformation component, given an identity of the requested function and an identity of a calling program module.

Figure 16:
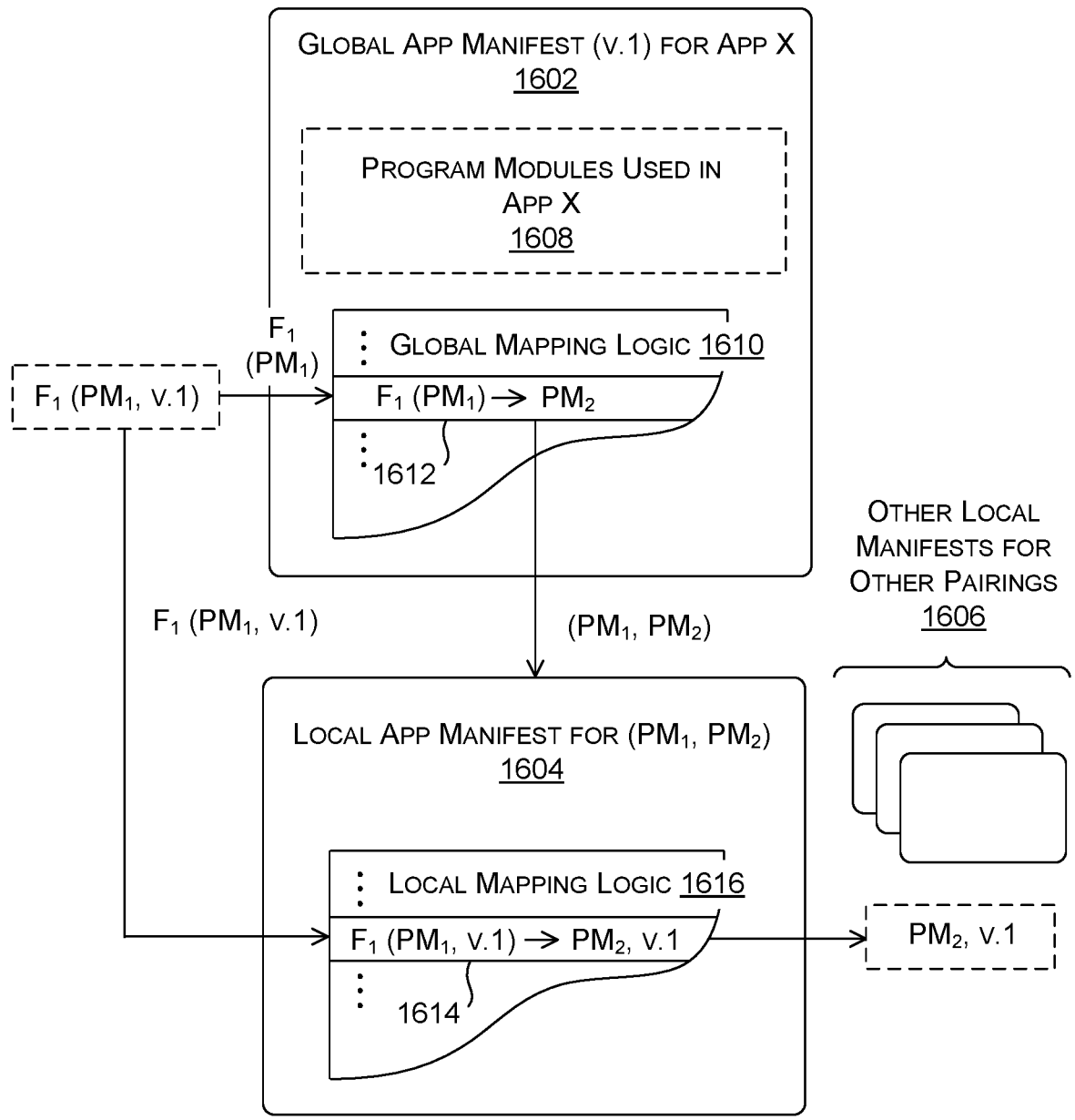

FIG. 16 shows an example in which the manifest-managing component 712 (of FIG. 7) does not (necessarily) update the entirety of an application manifest upon receipt of new program code. More specifically, the manifest-managing component 712 provides a global application manifest 1602 and a plurality of local application manifests (1604, 1606). The global application manifest 1602 includes a listing 1608 of all program modules used in a current version of a running application, to which the global application manifest applies (but without specifying their respective versions). The global application manifest 1602 also includes global mapping logic 1610 that maps input information specified by a calling program module to reference information that, in turn, can be used to access an appropriate local application manifest.

For example, assume that a mapping component (not shown) receives information regarding the function $F_1$ that the calling program module seeks to invoke, as well as the identity of the calling program module (here, $PM_1$). The mapping component uses this input information to identify an entry 1612 in the global mapping logic 1610. That entry, in turn, identifies a called program module ($PM_2$) that provides the requested function $F_1$. At this stage, however, the mapping component does not yet resolve what particular version of $PM_2$ provides the correct version of the function $F_1$. In other words, the global mapping logic 1610 provides a coarse mapping between calling and called program modules, as the global manifest does not contain mapping information at the granularity of module versions.

The mapping component can next use the pair ($PM_1$, $PM_2$) as reference information to access the local application manifest 1604, which is associated with this pairing of modules. It then uses the input information supplied by the calling program module to identify an entry 1614 in the local mapping logic 1616. That entry 1614 provides an identifier that specifies the called program module that includes the desired function $F_1$. At this time, the entry 1614 points to a specific version of $PM_2$. The mapping component leverages this information to access this called program module.

The manifest-managing component 712 can update the application manifest information shown in FIG. 16 in a piecemeal manner, rather than producing a complete new application manifest for any change in application code. For instance, assume that a new program contains a modification to just the second program module $PM_2$, e.g., by producing a version v.2 of this program module. The manifest-managing component 712 can selectively update the local application manifests that involve interaction with the second program module $PM_2$. The local application manifest 1604, which describes connections between the pairing ($PM_1$, $PM_2$), is one such local application manifest. The manifest-managing component 712 leaves the global application manifest 1602 unmodified, as well as any local application manifest that does not involve the second program module ($PM_2$). The manifest-managing component 712 can update the global mapping logic 1610 and create one or more new local application manifests when an update involves adding a program module that has no previous counterparts. Similarly, the manifest-managing component 712 can update the global mapping logic 1610 and remove one or more local application manifests when all versions of a particular application module are removed.

Other implementations can partition a complete mapping space into different portions in a different manner compared to that illustrated in FIG. 16. For example, another implementation can devote local application manifests for respective functions, e.g., for functions $F_1$, $F_2$, etc. Here, a global application manifest can direct a function call to an appropriate local manifest (associated with the called function) based on an identifier that specifies the invoked function. The global application manifest need only store information regarding the existence of different functions in the running application, not their specific versions. Another implementation can devote local application manifests to respective calling program modules (whereas the example of FIG. 16 devotes local application manifests to respective pairs of program modules). Here, a global application manifest can direct a function call to an appropriate local manifest (associated with the calling program module) based on an identifier that specifies the calling program module. The global application manifest need only store information regarding the existence of different calling program modules in the running application, not their specific versions. Still other mapping partitions are possible.

Figure 17:
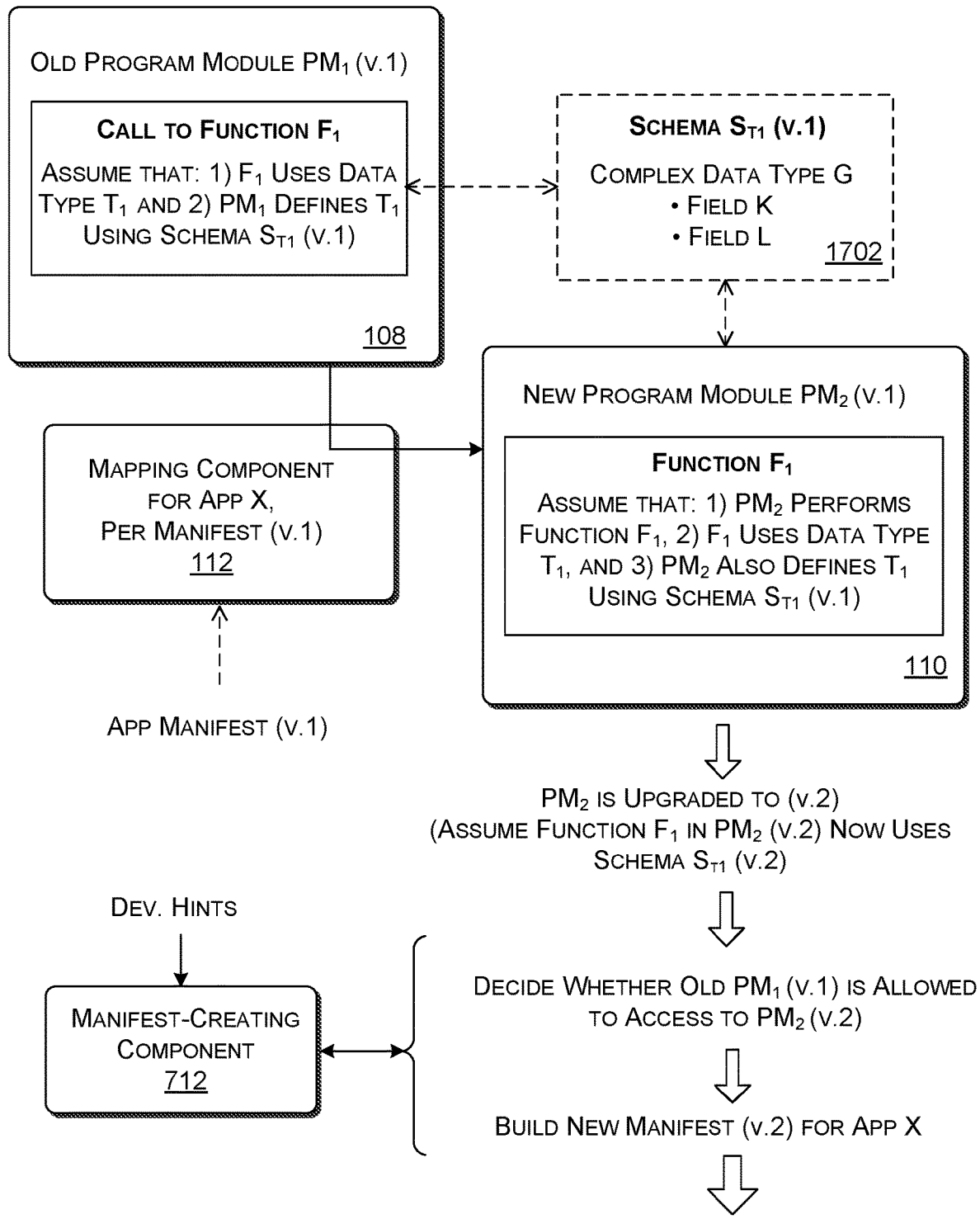
FIGS. 17 and 18 together show a third example of a technique for updating a running application.
Figure 18:
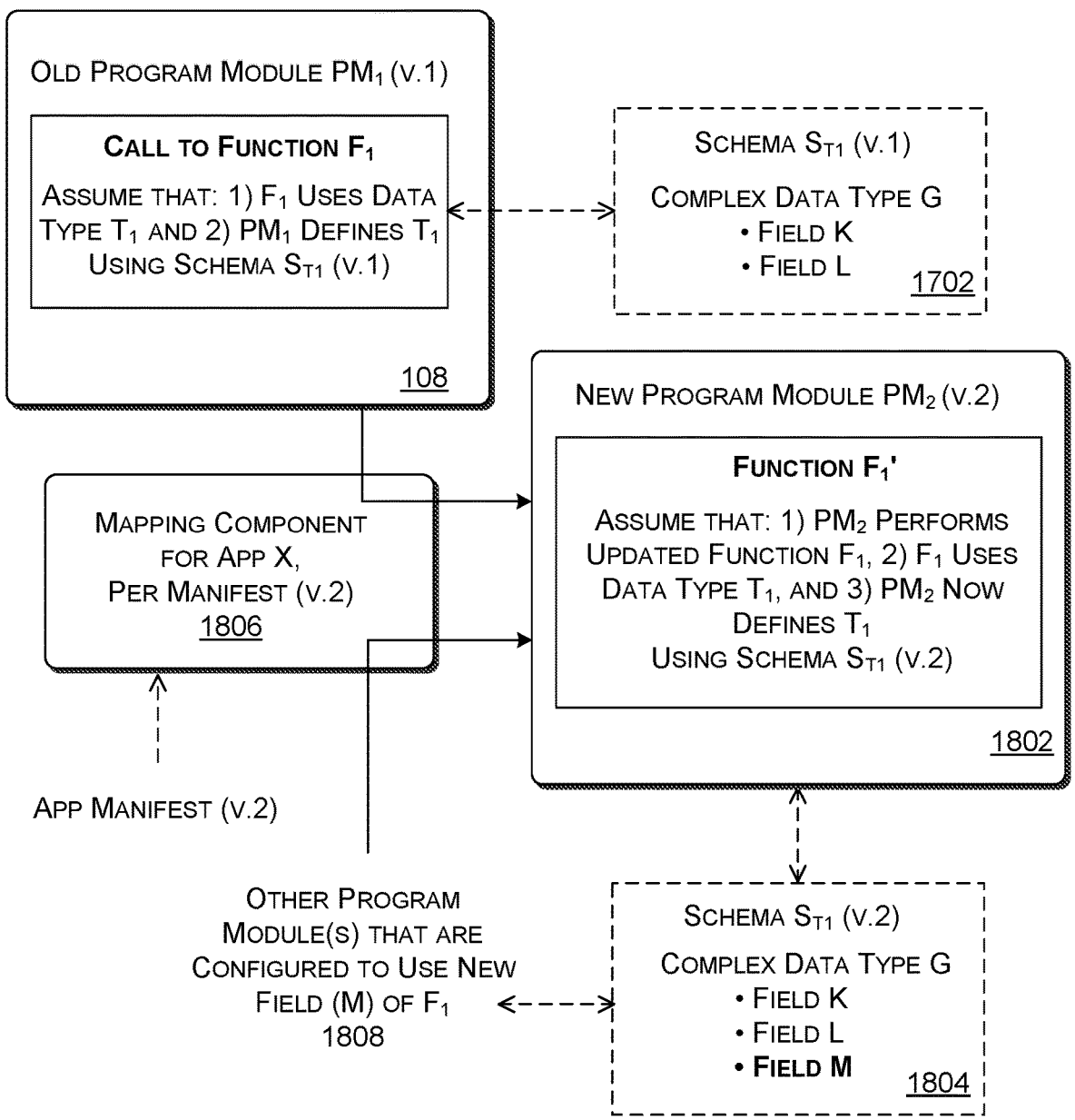

FIGS. 17 and 18 together describe a third example of the runtime environment 102. Referring first to FIG. 17, assume that, prior to an updating operation, a first version of the a calling program module $PM_1$ 108 includes a function $F_1$ that uses a data item of type $T_1$, where that type $T_1$ is defined with reference to a first schema ($ST_1$, v.1) 1702. A called program module ($PM_2$ v.1) 110 implements the function $F_1$. Assume that the called program module 110 uses the same schema ($ST_1$, v.1) 1702 to define the data type $T_1$. A mapping component 112 maps the first program module's request for function $F_1$ to an identifier associated with the called program module $PM_2$ 110. In other words, so far, the scenario of FIG. 17 corresponds to the scenario set forth in FIG. 1.

Next assume that the runtime environment 102 receives new program code that provides a change to the called program module $PM_2$ 110. The change specifically includes a modification to the logic employed to the called program module $PM_2$ 110 and the schema by which type $T_1$ is defined. That is, the new program now defines data type $T_1$ using a second schema ($ST_1$ v.2). In response to this change, the manifest-managing component 712 creates a new application manifest for a new configuration (v.2) of the running application.

In this example, assume the manifest-managing component 712 determines that there is an inconsistency between the data types by which the calling program module 108 and the updated called program module define the data type $T_1$. Nevertheless, the manifest-managing component 712 concludes that it is not necessary to invoke transformation logic to map an input data item (received from the first program module 108) into a form consistent with the second program module as updated. That is, the manifest-managing component 712 concludes that it is possible to directly send the original data item (received from the calling program module 108) to the updated called program module without modification.

The manifest-managing component 712 can conclude that it is permissible to ignore a pair of program modules with inconsistent definitions of data types when: a) the schema used by the calling program module to define a data type contains a superset of information specified in a schema used by the calling program module; and b) the parts of the schema that remain the same across versions do not change in meaning. These two conditions hold true in the example of FIG. 17. Assume that the calling program module 108 uses a first version of the schema ($ST_1$, v.1) that defines $T_1$ using two fields (K and L). The second version of the schema ($ST_1$, v.2) used by the called program module (after the update) defines $T_1$ using an additional field M. The second schema is a superset of the first schema 1702 because it includes the same fields that appear in the first schema 1702. Moreover, assume that the second schema does not assign a new meaning to the fields K and L. For instance, assume that fields the K and L continue to refer to a keyword and a location across both versions of the schema.

In one implementation, the manifest-managing component 712 can determine that elements K and L that appear in the second schema have the same meaning as elements K and L that appear in the first schema 1702 based on the use of the same names to describe the elements in both schemas (e.g., the names "keyword" and "location," etc.). Alternatively, or in addition, the manifest-managing component 712 can rely on the developer to provide explicit annotations in the second schema to identify when the common elements have the same semantics, or when they have different semantics.

FIG. 18 shows the runtime environment 102 following the upgrade described above. In this case, the calling program module $PM_1$ 108 now interacts with a second version (v.2) of the called program module $PM_2$ 1802. The called program module 1802 now defines the type $T_1$ with reference to a second schema 1804. An instance of a mapping component 1806 uses a version v.2 of the application manifest to map a call from the calling program module 108 to the second version of the called program module 1802. In one case, the called program module 1802 can ignore the absence of an expected field M, e.g., by setting a value for that field to a default value. For example, the developer of the called program module 1802 can create instructions in the code for $PM_2$ v.2 that perform this function.

Note that other calling program modules, such as representative calling program module 1808, may define the data type $T_1$ using the second schema 1804. This means that the called program module 1802 can receive both data items from legacy program modules that omit field M (such as calling program module 108) and updated program modules that include the field M (such as the calling program 1808).

The systems and techniques were set forth above in the context of illustrative and non-limiting examples, but can be modified in various ways. For example, the three examples set forth in FIGS. 1-4, 17, and 18 involved changes to the called program module, leaving the calling program module intact. In other examples, an update operation can change a calling program module and not the called program module. In still other examples, an update operation can change both the calling program module and the called program module.

Further note that the transformation component was described as performing a role in upgrading a data item from a first form to a second form, where the second form may typically represent a later more complex or nuanced or accurate version compared to the first form. In other examples, a transformation component can downgrade a received data item, e.g., by deleting a field from it to produce a target data item.

B. Illustrative Processes

Figure 20:
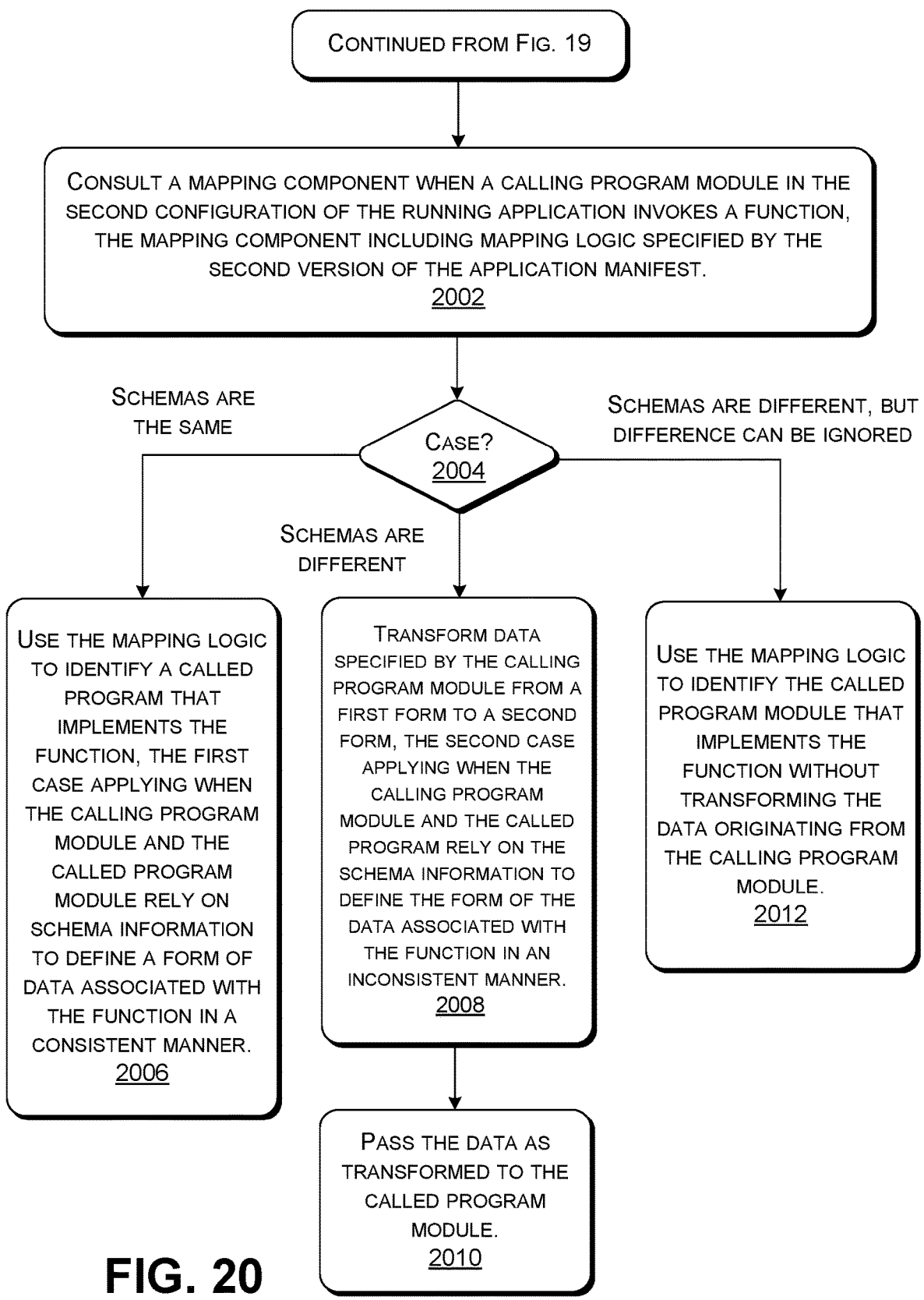

FIGS. 19 and 20 together show a process 1902 that explains the operation of the runtime environment 102 of FIGS. 5 and 6, which encompasses the role performed by the runtime management system 516. Since the principles underlying the operation of the runtime environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

In block 1904, the runtime environment 102 provides a first configuration of a running application, the first configuration of the running application including a first set of program modules in memory that is described by a first version of an application manifest. In block 1906, the runtime environment 102 receives new program code that specifies a modification to the first configuration of the running application. In response to the operation of receiving, in block 1908, the runtime environment 102 updates the first version of the application manifest to create a second version of the application manifest. In block 1910, the runtime environment 102 updates the first configuration of the running application to provide a second configuration of the running application, while the first configuration of the running application continues to run. The second configuration of the running application includes a second set of program modules that is described by the second version of the application manifest. Note, however, that the second set of program modules includes a subset of the first set of program modules, and hence does not require reloading that subset into memory.

Continuing with FIG. 20, in block 2002, the runtime environment 102 consults a mapping component when a calling program module in the second configuration of the running application invokes a function. The mapping component includes mapping logic specified by the second version of the application manifest. Block 2004 determines which case of at least three cases applies. In block 2006, for a first case, the runtime environment 102 uses the mapping logic to identify a called program module that implements the function. The first case corresponds to a scenario in which the calling program module and the called program module rely on schema information to define a form of data associated with the function in a consistent manner. In block 2008, for a second case, the runtime environment 102 transforms data specified by the calling program module from a first form to a second form. The second case corresponds to a scenario in which the calling program and the called program rely on the schema information to define the form of the data associated with the function in an inconsistent manner. In one implementation, block 2008 involves using the mapping logic (specified by the second version of the application manifest) to identify an instance of transformation logic that will perform the desired transformation operation. In block 2010, the runtime environment 102 passes the transformed data to the called program module. In block 2012, for a third case, the calling program module and the called program module again rely on schema information to define the form of the data associated with the function in an inconsistent manner. But here the runtime environment 102 uses the mapping logic to identify the called program module that implements the function without transforming the data originating from the calling program module.

C. Representative Computing Functionality

Figure 21:
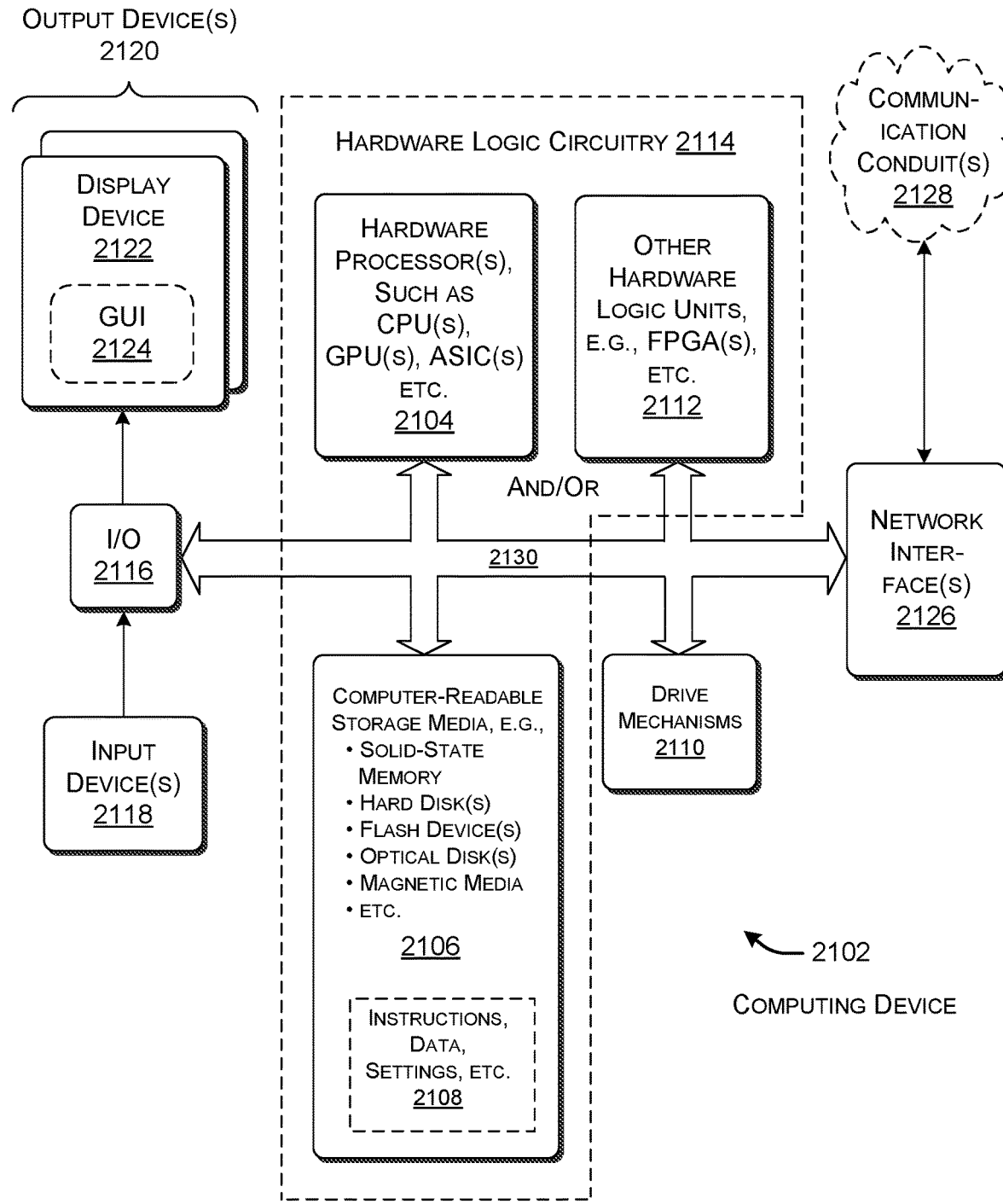
FIG. 21 shows an illustrative type of computing device that can be used to implement any aspect of the features shown in the foregoing drawings.

FIG. 21 shows a computing device 2102 that can be used to implement any aspect of the mechanisms set forth in the above-described figures. For instance, with reference to FIG. 5, the type of computing device 2102 shown in FIG. 21 can be used to implement any server in the data center(s) 504, any client computing device, etc. In all cases, the computing device 2102 represents a physical and tangible processing mechanism.

The computing device 2102 can include one or more hardware processors 2104. The hardware processor(s) 2104 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 2102 can also include computer-readable storage media 2106, corresponding to one or more computer-readable media hardware units. The computer-readable storage media 2106 retains any kind of information 2108, such as machine-readable instructions, settings, data, etc. Without limitation, for instance, the computer-readable storage media 2106 may include one or more solid-state devices, one or more magnetic hard disks, one or more optical disks, and so on. Any instance of the computer-readable storage media 2106 can use any technology for storing and retrieving information. Further, any instance of the computer-readable storage media 2106 may represent a fixed or removable unit of the computing device 2102. Further, any instance of the computer-readable storage media 2106 may provide volatile or non-volatile retention of information.

The computing device 2102 can utilize any instance of the computer-readable storage media 2106 in different ways. For example, any instance of the computer-readable storage media 2106 may represent a hardware memory unit (such as Random Access Memory (RAM)) for storing transient information during execution of a program by the computing device 2102, and/or a hardware storage unit (such as a hard disk) for retaining/archiving information on a more permanent basis. In the latter case, the computing device 2102 also includes one or more drive mechanisms 2110 (such as a hard drive mechanism) for storing and retrieving information from an instance of the computer-readable storage media 2106.

The computing device 2102 may perform any of the functions described above when the hardware processor(s) 2104 carry out computer-readable instructions stored in any instance of the computer-readable storage media 2106. For instance, the computing device 2102 may carry out computer-readable instructions to perform each block of the processes described in Section B.

Alternatively, or in addition, the computing device 2102 may rely on one or more other hardware logic units 2112 to perform operations using a task-specific collection of logic gates. For instance, the hardware logic unit(s) 2112 may include a fixed configuration of hardware logic gates, e.g., that are created and set at the time of manufacture, and thereafter unalterable. Alternatively, or in addition, the other hardware logic unit(s) 2112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 21 generally indicates that hardware logic circuitry 2114 includes, but it not limited to, any combination of the hardware processor(s) 2104, the computer-readable storage media 2106, and/or the other hardware logic unit(s) 2112. That is, the computing device 2102 can employ any combination of the hardware processor(s) 2104 that execute machine-readable instructions provided in the computer-readable storage media 2106, and/or one or more other hardware logic unit(s) 2112 that perform operations using a fixed and/or programmable collection of hardware logic gates. More generally stated, the hardware logic circuitry 2114 corresponds to one or more hardware-implemented logic units of any type(s) that perform operations based on logic stored in and/or otherwise embodied in the hardware logic unit(s).

In some cases (e.g., in the case in which the computing device 2102 represents a user computing device), the computing device 2102 also includes an input/output interface 2116 for receiving various inputs (via input devices 2118), and for providing various outputs (via output devices 2120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 2122 and an associated graphical user interface presentation (GUI) 2124. The display device 2122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 2102 can also include one or more network interfaces 2126 for exchanging data with other devices via one or more communication conduits 2128. One or more communication buses 2130 communicatively couple the above-described units together.

The communication conduit(s) 2128 can be implemented in any manner, e.g., by a local area computer network, a wide area computer network (e.g., the Internet), point-to-point connections, etc., or any combination thereof. The communication conduit(s) 2128 can include any combination of hardwired links, wireless links, routers, gateway functionality, name servers, etc., governed by any protocol or combination of protocols.

FIG. 21 shows the computing device 2102 as being composed of a discrete collection of separate units. In some cases, the collection of units may correspond to discrete hardware units provided in a computing device chassis having any form factor. In other cases, the computing device 2102 can include a hardware logic unit that integrates the functions of two or more of the units shown in FIG. 1. For instance, the computing device 2102 can include a system-on-a-chip (SoC or SOC), corresponding to an integrated circuit that combines the functions of two or more of the units shown in FIG. 21.

The following summary provides a non-exhaustive set of illustrative aspects of the technology set forth herein.

According to a first aspect, a method, performed by one or more computing devices, is described for updating a running application. The method includes providing a first configuration of the running application in a runtime environment, the first configuration of the running application including a first set of program modules provided in memory, the first set of program modules being described by a first version of an application manifest; and receiving new program code that specifies a modification to the first configuration of the running application. In response to the operation of receiving, the method includes: updating the first version of the application manifest to create a second version of the application manifest; and updating the first configuration of the running application to provide a second configuration of the running application, while the first configuration of the running application continues to run. The second configuration of the running application includes a second set of program modules that is described by the second version of the application manifest. Further, a subset of one or more program modules in the second set of program modules also belongs to the first set of program modules. The method also includes consulting a mapping component when a calling program module in the second configuration of the running application invokes a function, the mapping component including mapping logic specified by the second version of the application manifest. For a first case, the method includes using the mapping logic to identify a called program that implements the function, the first case applying when the calling program module and the called program module rely on schema information to define a form of data associated with the function in a consistent manner. For a second case, the method includes transforming data specified by the calling program module from a first form to a second form, and then passing the data as transformed to the called program module, the second case applying when the calling program module and the called program rely on the schema information to define the form of the data associated with the function in an inconsistent manner.

According to a second aspect, the method further includes: associating first work items with the first configuration of the running application prior to the providing of the second configuration of the running application; associating second work items with the second configuration of the running application after the providing of the second configuration of the running application; and processing the first work items with the first configuration of the running application, and processing the second work items with the second configuration of the running application.

According to a third aspect, relating to the second aspect, a work item is a query, and wherein each configuration of the running application processes the query to generate an output search result.

According to a fourth aspect, relating to the third aspect, the method further includes associating a query upon receipt with a current version of the application manifest.

According to a fifth aspect, relating to the second aspect, the method further includes discarding use of the first version of the application manifest after the first work items have been processed using the first configuration of the running application.

According to a sixth aspect, the operation of transforming involves adding a field to an original version of a data item, and/or deleting a field from the original version of the data item.

According to a seventh aspect, the calling program module defines the data associated with the function using a first schema, and the called program module defines the data associated with the function using a second schema, the first schema differing from the second schema. The operation of transforming uses transformation logic specified in the second schema to transform the data specified by the calling program module.

According to an eighth aspect, relating to the seventh aspect, the transformation logic includes plural instances of transformation logic associated with different respective schemas used by calling program modules. The operation of transforming applies a particular instance of transformation logic that is associated with the second schema used by the calling component.

According to a ninth aspect, relating to the eighth aspect, the mapping logic identifies an instance of transformation logic to be applied to transform the data specified by the calling program module.

According to a tenth aspect, the mapping logic includes a plurality of entries, and wherein the method accesses an entry based on information that specifies a version associated with the calling program module and information that specifies the function that has been invoked.

According to an eleventh aspect, the first version of the application manifest includes a first version of the mapping logic, and the operation of updating the first version of the application manifest includes updating an entirety of the first version of mapping logic.

According to a twelfth aspect, the first version of the application manifest includes a first version of the mapping logic. Further, the operation of updating of the first version of the application manifest includes updating a part of the first version of mapping logic that is impacted by the new program code, and not updating another part of the first version of the mapping logic.

According to a thirteenth aspect, relating to the twelfth aspect, the new program code makes a change to the calling program module and/or the called program module. Further, the part of the first version of the mapping logic that is updated includes pair-specific mapping logic that describes connections between the calling program module and the called program module.

According to a fourteenth aspect, for a third case, the calling program module defines the data associated with the function using a first schema, and the called program module defines the data associated with the function using a second schema, the first schema differing from the second schema. The method further includes determining that the calling program module can continue to utilize the function provided by the called program module, despite inconsistency between the first schema and the second schema. The method includes using the mapping logic to identify the called program that contains the function without transforming the data specified by the calling program module.

According to a fifteenth aspect, relating to the fourteenth aspect, the operation of determining ascertains that the third case applies when: the second schema includes a superset of information specified in the first schema, and the second schema does not change a meaning associated with a common portion of the first schema and the second schema.

According to a sixteenth aspect, one or more computing devices are described that include hardware logic circuitry. The hardware logic circuitry includes: (a) one or more hardware processors that perform operations by executing machine-readable instructions stored in a memory, and/or (b) one or more other hardware logic units that perform the operations using a task-specific collection of logic gates. The operations include receiving new program code that specifies a modification to a first configuration of a running application, the first configuration of the running application including a first set of program modules provided in memory, the first set of program modules being described by a first version of an application manifest. In response to the operation of receiving, the operations include: updating the first version of the application manifest to create a second version of the application manifest; and updating the first configuration of the running application to provide a second configuration of the running application, while the first configuration of the running application continues to run. The second configuration of the running application includes a second set of program modules that is described by the second version of the application manifest. Further, a subset of one or more program modules in the second set of program modules also belongs to the first set of program modules. The operations further include consulting a mapping component when a calling program module in the second configuration of the running application invokes a function, the mapping component including mapping logic specified by the second version of the application manifest. The first version of the application manifest includes a first version of the mapping logic. Further, the operation of updating the first version of the application manifest includes updating a part of the first version of the mapping logic that is impacted by the new program code, and not updating another part of the first version of the mapping logic.

According to a seventeenth aspect, relating to the sixteenth aspect, the new program code makes a change to the calling program module and/or the called program module. The part of the first version of the mapping logic that is updated includes pair-specific mapping logic that describes connections between the calling program module and the called program module.

According to an eighteenth aspect, relating to the sixteenth aspect, for a particular case, the operations further include using the mapping logic to identify a called program module that contains the function, the particular case applying when the calling program module and the called program module rely on schema information to define a form of data associated with the function in a consistent manner.

According to a nineteenth aspect, for a particular case, the operations further include transforming data specified by the calling program module from a first form to a second form, and then passing the data as transformed to the called program module, the particular case applying when the calling program module and a called program rely on schema information to define a form of data associated with the function in an inconsistent manner.

According to a twentieth aspect, a computer-readable storage medium for storing computer-readable instructions is described. The computer-readable instructions, when executed by one or more hardware processors, perform a method that includes receiving new program code that specifies a modification to a first configuration of a running application, the first configuration of the running application including a first set of program modules provided in memory, the first set of program modules being described by a first version of an application manifest. In response to the operation of receiving, the method includes: updating the first version of the application manifest to create a second version of the application manifest; and updating the first configuration of the running application to provide a second configuration of the running application, while the first configuration of the running application continues to run. The second configuration of the running application includes a second set of program modules that is described by the second version of the application manifest. Further, a subset of one or more program modules in the second set of program modules also belong to the first set of program modules. The method further includes: consulting a mapping component when a calling program module in the second configuration of the running application invokes a function, the mapping component including mapping logic specified by the second version of the application manifest; using the mapping logic to identify transformation logic for a case in which the calling program module and a called program module rely on schema information to define data associated with the function in an inconsistent manner; and using the transformation logic to transform data specified by the calling program module for consumption by the called program module, the transforming operating by modifying the data specified by the calling program module from a first form to a second form.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by one or more computing devices, for updating a running application, comprising:
providing a first configuration of the running application in a runtime environment, the first configuration of the running application including a first set of program modules provided in memory, the first set of program modules being described by a first version of an application manifest;
receiving new program code that specifies a modification to the first configuration of the running application;
in response to said receiving:
updating the first version of the application manifest to create a second version of the application manifest; and
updating the first configuration of the running application to provide a second configuration of the running application, while the first configuration of the running application continues to run,
the second configuration of the running application including a second set of program modules that is described by the second version of the application manifest,
a subset of one or more program modules in the second set of program modules also belonging to the first set of program modules;
consulting a mapping component when a calling program module in the second configuration of the running application invokes a function, the mapping component including mapping logic specified by the second version of the application manifest;
for a first case, using the mapping logic to identify a called program module that implements the function, the first case applying when the calling program module and the called program module rely on schema information to define a form of data associated with the function in a consistent manner; and
for a second case, transforming data specified by the calling program module from a first form to a second form, and then passing the data as transformed to the called program module, the second case applying when the calling program module and the called program module rely on the schema information to define the form of the data associated with the function in an inconsistent manner.

2. The method of claim 1, further including:
associating first work items with the first configuration of the running application prior to providing the second configuration of the running application;
associating second work items with the second configuration of the running application after providing the second configuration of the running application; and
processing the first work items with the first configuration of the running application, and processing the second work items with the second configuration of the running application.

3. The method of claim 2, wherein a particular work item is a query, and wherein each configuration of the running application processes the query to generate an output search result.

4. The method of claim 3, further including associating the query upon receipt with a current version of the application manifest.

5. The method of claim 2, further including discarding use of the first version of the application manifest after the first work items have been processed using the first configuration of the running application.

6. The method of claim 1, wherein said transforming involves adding a field to an original version of a data item, and/or deleting a field from the original version of the data item.

7. The method of claim 1,
wherein the calling program module defines the data associated with the function using a first schema, and the called program module defines the data associated with the function using a second schema, the first schema differing from the second schema, and
wherein said transforming uses transformation logic specified in the second schema to transform the data specified by the calling program module.

8. The method of claim 7,
wherein the transformation logic includes plural instances of transformation logic associated with different respective schemas used by calling program modules, and wherein said transforming applies a particular instance of transformation logic that is associated with the second schema used by the calling component.

9. The method of claim 8, wherein the mapping logic identifies the particular instance of transformation logic to be applied to transform the data specified by the calling program module.

10. The method of claim 1, wherein the mapping logic includes a plurality of entries, and wherein the method accesses an entry based on information that specifies a version associated with the calling program module and information that specifies the function that has been invoked.

11. The method of claim 1,
wherein the first version of the application manifest includes a first version of the mapping logic, and
wherein said updating of the first version of the application manifest includes updating an entirety of the first version of mapping logic.

12. The method of claim 1,
wherein the first version of the application manifest includes a first version of the mapping logic, and
wherein said updating of the first version of the application manifest includes updating a part of the first version of mapping logic that is impacted by the new program code, and not updating another part of the first version of the mapping logic.

13. The method of claim 12,
wherein the new program code makes a change to the calling program module and/or the called program module, and
wherein the part of the first version of the mapping logic that is updated includes pair-specific mapping logic that describes connections between the calling program module and the called program module.

14. The method of claim 1,
wherein, for a third case, the calling program module defines the data associated with the function using a first schema, and the called program module defines the data associated with the function using a second schema, the first schema differing from the second schema,
wherein the method further includes determining that the calling program module can continue to utilize the function provided by the called program module, despite inconsistency between the first schema and the second schema, and
wherein the method includes using the mapping logic to identify the called program module that contains the function without transforming the data specified by the calling program module.

15. The method of claim 14, wherein said determining ascertains that the third case applies when: the second schema includes a superset of information specified in the first schema, and the second schema does not change a meaning associated with a common portion of the first schema and the second schema.

16. One or more computing devices, comprising:
hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
receiving new program code that specifies a modification to a first configuration of a running application, the first configuration of the running application including a first set of program modules provided in memory, the first set of program modules being described by a first version of an application manifest;
in response to said receiving:
updating the first version of the application manifest to create a second version of the application manifest; and
updating the first configuration of the running application to provide a second configuration of the running application, while the first configuration of the running application continues to run,
the second configuration of the running application including a second set of program modules that is described by the second version of the application manifest,
a subset of one or more program modules in the second set of program modules also belonging to the first set of program modules; and
consulting a mapping component when a calling program module in the second configuration of the running application invokes a function, the mapping component including mapping logic specified by the second version of the application manifest,
the first version of the application manifest including a first version of the mapping logic, and
said updating of the first version of the application manifest including updating a part of the first version of the mapping logic that is impacted by the new program code, and not updating another part of the first version of the mapping logic.

17. The one or more computing devices of claim 16,
wherein the new program code makes a change to the calling program module and/or the called program module, and
wherein the part of the first version of the mapping logic that is updated includes pair-specific mapping logic that describes connections between the calling program module and the called program module.

18. The one or computing devices of claim 16, wherein, for a particular case, the operations further include using the mapping logic to identify a called program module that contains the function, the particular case applying when the calling program module and the called program module rely on schema information to define a form of data associated with the function in a consistent manner.

19. The one or more computing devices of claim 16, wherein, for a particular case, the operations further include transforming data specified by the calling program module from a first form to a second form, and then passing the data as transformed to a called program module, the particular case applying when the calling program module and the called program module rely on schema information to define a form of data associated with the function in an inconsistent manner.

20. A computer-readable storage medium for storing computer-readable instructions, the computer-readable instructions, when executed by one or more hardware processors, performing a method that comprises:
receiving new program code that specifies a modification to a first configuration of a running application, the first configuration of the running application including a first set of program modules provided in memory, the first set of program modules being described by a first version of an application manifest;

in response to said receiving:
- updating the first version of the application manifest to create a second version of the application manifest; and
- updating the first configuration of the running application to provide a second configuration of the running application, while the first configuration of the running application continues to run,
- the second configuration of the running application including a second set of program modules that is described by the second version of the application manifest,
- a subset of one or more program modules in the second set of program modules also belonging to the first set of program modules;

consulting a mapping component when a calling program module in the second configuration of the running application invokes a function, the mapping component including mapping logic specified by the second version of the application manifest;

using the mapping logic to identify transformation logic for a case in which the calling program module and a called program module rely on schema information to define data associated with the function in an inconsistent manner; and using the transformation logic to transform data specified by the calling program module for consumption by the called program module, said using the transformation logic operating by modifying the data specified by the calling program module from a first form to a second form.

* * * * *